United States Patent                (10) Patent No.:     US 10,391,884 B2
Iwahana                                 (45) Date of Patent:        Aug. 27, 2019

(54) DRIVE POWER CONTROL DEVICE FOR ELECTRIC VEHICLE

(71) Applicant: CALSONIC KANSEI CORPORATION, Saitama-shi, Saitama (JP)

(72) Inventor: Toshiyuki Iwahana, Saitama (JP)

(73) Assignee: CALSONIC KANSEI CORPORATION, Sitama-Shi (JP)

(*) Notice: Subject to any disclaimer, the term of this patent is extended or adjusted under 35 U.S.C. 154(b) by 166 days.

(21) Appl. No.: 15/560,627

(22) PCT Filed: Mar. 25, 2016

(86) PCT No.: PCT/JP2016/059552
§ 371 (c)(1),
(2) Date: Sep. 22, 2017

(87) PCT Pub. No.: WO2016/158720
PCT Pub. Date: Oct. 6, 2016

(65) Prior Publication Data
US 2018/0056811 A1    Mar. 1, 2018

(30) Foreign Application Priority Data

Mar. 27, 2015   (JP) ................... 2015-066286

(51) Int. Cl.
*B60L 15/20*     (2006.01)
*H02P 29/00*     (2016.01)
(Continued)

(52) U.S. Cl.
CPC .............. *B60L 15/20* (2013.01); *B60L 3/10* (2013.01); *B60L 15/2072* (2013.01);
(Continued)

(58) Field of Classification Search
CPC ........ B60L 15/20; B60L 3/10; B60L 15/2072; B60L 2240/12; B60L 2240/461;
(Continued)

(56) References Cited

U.S. PATENT DOCUMENTS 5,444,351 A * 8/1995 Yamamura ............ B60L 15/025
                                                    318/432
5,633,456 A * 5/1997 Stander .................. G01M 15/11
                                                    123/436
(Continued)

FOREIGN PATENT DOCUMENTS

JP   H07-186665 A   7/1995
JP   H08-182118 A   7/1996
(Continued)

*Primary Examiner* — Jaime Figueroa
(74) *Attorney, Agent, or Firm* — Foley & Lardner LLP

(57) ABSTRACT

A drive power control device includes: a modeling error reduction unit configured to calculate a correction torque by performing high-pass filter processing on a correction amount calculated by a correction amount calculation unit; a control motor torque command value calculation unit configured to calculate a control motor torque command value by adding the correction torque to a motor torque command value; and a slip reduction control unit configured to perform, when the vehicle starts traveling or slip is detected, control to reduce slip by switching the cutoff frequency of a high-pass filter HPF to be low as compared with normal traveling.

13 Claims, 14 Drawing Sheets

(51) Int. Cl.
  *B60L 3/10* (2006.01)
  *H02P 23/20* (2016.01)
  *H02P 23/30* (2016.01)

(52) U.S. Cl.
  CPC .............. *H02P 23/20* (2016.02); *H02P 23/30* (2016.02); *H02P 29/00* (2013.01); *B60L 2240/12* (2013.01); *B60L 2240/20* (2013.01); *B60L 2240/421* (2013.01); *B60L 2240/423* (2013.01); *B60L 2240/461* (2013.01); *B60L 2240/465* (2013.01); *B60L 2250/26* (2013.01); *Y02T 10/644* (2013.01); *Y02T 10/645* (2013.01); *Y02T 10/7275* (2013.01)

(58) Field of Classification Search
  CPC .......... B60L 2250/26; B60L 2240/421; B60L 2240/465; B60L 2240/20; B60L 2240/423; H02P 29/00; H02P 23/30; H02P 23/20; Y02T 10/645; Y02T 10/644; Y02T 10/7275
  USPC .......................................................... 700/22
  See application file for complete search history.

(56) References Cited

U.S. PATENT DOCUMENTS

| | | | | | |
|---|---|---|---|---|---|
| 5,720,533 | A | * | 2/1998 | Pastor | B60T 8/175 303/140 |
| 5,863,105 | A | * | 1/1999 | Sano | B60T 8/17552 303/140 |
| 5,961,565 | A | * | 10/1999 | Kawabe | B60K 28/165 180/197 |
| 6,035,251 | A | * | 3/2000 | Hac | B60T 8/1755 303/140 |
| 6,226,587 | B1 | * | 5/2001 | Tachihata | B60K 28/16 303/146 |
| 6,254,204 | B1 | * | 7/2001 | Hara | B60T 8/171 303/183 |
| 6,374,172 | B1 | * | 4/2002 | Yamaguchi | B60T 8/172 701/101 |
| 6,856,886 | B1 | * | 2/2005 | Chen | B60T 8/172 303/146 |
| 7,274,984 | B2 | * | 9/2007 | Shin | B60T 8/17551 303/146 |
| 7,502,676 | B2 | * | 3/2009 | Ono | B60T 8/172 701/41 |
| 8,170,768 | B2 | * | 5/2012 | Fujimoto | B60L 3/10 701/90 |
| 8,631,693 | B2 | * | 1/2014 | Johnson | G01M 17/0074 73/116.05 |
| 8,706,378 | B2 | * | 4/2014 | Choby | B60T 8/172 180/197 |
| 8,725,359 | B2 | * | 5/2014 | Uematsu | B60K 17/35 701/50 |
| 9,145,127 | B2 | * | 9/2015 | Uematsu | B60T 8/175 |
| 9,387,859 | B2 | * | 7/2016 | Kato | B60L 3/102 |
| 9,740,664 | B2 | * | 8/2017 | Wu | G06F 17/156 |
| 2001/0020789 | A1 | * | 9/2001 | Nakashima | B60K 6/365 290/40 C |
| 2004/0019417 | A1 | * | 1/2004 | Yasui | B60G 17/0195 701/36 |
| 2004/0102289 | A1 | * | 5/2004 | Aikawa | F16H 61/061 477/176 |
| 2005/0038589 | A1 | * | 2/2005 | Shukla | B60T 8/172 701/80 |
| 2005/0274560 | A1 | * | 12/2005 | Wakao | B60L 3/102 180/197 |
| 2006/0074541 | A1 | * | 4/2006 | Ono | B60T 8/172 701/80 |
| 2008/0167784 | A1 | * | 7/2008 | Fujita | B60K 28/16 701/71 |
| 2009/0210128 | A1 | * | 8/2009 | Fujimoto | B60L 3/10 701/84 |
| 2012/0083953 | A1 | * | 4/2012 | Izawa | B60L 50/16 701/22 |
| 2015/0012160 | A1 | | 1/2015 | Tsutsumi et al. | |
| 2016/0347201 | A1 | | 12/2016 | Osamura et al. | |

FOREIGN PATENT DOCUMENTS

| | | |
|---|---|---|
| JP | 2000-052964 A | 2/2000 |
| JP | 2009-095145 A | 4/2009 |
| JP | 2013-169054 A | 8/2013 |
| WO | WO-2015-111341 A1 | 7/2015 |

* cited by examiner

US 10,391,884 B2

DRIVE POWER CONTROL DEVICE FOR ELECTRIC VEHICLE

TECHNICAL FIELD

The present invention relates to a drive power control device for an electric vehicle.

BACKGROUND ART

Typically, a motor as a drive source of an electric vehicle has a relatively large low-rotation torque, and thus, when the vehicle starts traveling or is traveling, a wheel of the vehicle is likely to slip on a road surface (low μ road) such as a frozen road or a dry sanded road having a small friction coefficient.

Various technologies to reduce slip of such an electric vehicle have been proposed (Patent Literature 1).

In a drive power control device for an electric vehicle according to Patent Literature 1, as illustrated in FIG. 17, a vehicle controller 508 calculates the acceleration of a wheel 505 of a motor 502, and determines whether slip has occurred based on the acceleration and a current torque command value T. If it is determined that slip has occurred, the vehicle controller 508 commands a reduced torque command value for the motor 502 to the motor controller 507. If it is determined that slip has not occurred, the vehicle controller 508 performs such control that normal traveling control starts after the current torque command value reaches a basic torque value, thereby achieving smooth traveling on a road having a low friction resistance.

CITATION LIST

Patent Literature

Patent Literature 1: Japanese Patent Application Publication No. Hei 8-182118

SUMMARY OF INVENTION

Technical Problem

In the above-described conventional technology, slip reduction control and other control are performed by the vehicle controller 508 at a higher order (provided that the "higher order" refers to a control system upstream based on the motor 502) than the motor controller 507.

The calculation speed of the vehicle controller 508 is typically lower than that of the motor controller 507, which potentially causes a delay in slip reduction control processing.

When CAN communication is employed for communication between the vehicle controller 508 and the motor controller 507 as in the above-described technology, a relatively low communication speed thereof results in low control response of slip reduction.

The present invention has been made in view of the above-described problem, and has an object to provide a drive power control device for an electric vehicle, which can improve the processing speed and response of slip reduction control.

Solution to Problem

To achieve the above-described intension, a drive power control device for an electric vehicle equipped with a motor as a drive source according to the present invention includes: a target motor torque calculation unit configured to calculate a target motor torque for the electric vehicle based on an accelerator operation by a driver; a target acceleration calculation unit configured to calculate a target acceleration by dividing the target motor torque by an inertia of a drive system mounted on the electric vehicle; a motor rotation speed detection unit configured to detect an actual motor rotation speed; an actual acceleration calculation unit configured to calculate an actual acceleration by differentiating the motor rotation speed detected by the motor rotation speed detection unit; a correction amount calculation unit configured to calculate a correction amount for a motor torque command value so that a deviation between the target acceleration calculated by the target acceleration calculation unit and the actual acceleration calculated by the actual acceleration calculation unit is reduced; a modeling error reduction unit configured to calculate a correction torque by performing high-pass filter processing on the correction amount calculated by the correction amount calculation unit; a control motor torque command value calculation unit configured to calculate a control motor torque command value by adding the correction torque to the motor torque command value; and a slip reduction control unit configured to perform, when the vehicle starts traveling or slip is detected, control to reduce slip by switching the cutoff frequency of a high-pass filter to be low as compared with normal traveling.

Advantageous Effects of Invention

The present invention can achieve improved response of slip reduction control.

DESCRIPTION OF EMBODIMENTS

Exemplary embodiments of the present invention will be described below in detail with reference to the accompanying drawings. Any identical members in the accompanying drawings are denoted by an identical reference sign, and any duplicate description thereof is omitted. The following description will be made on a best mode in which the present invention is performed, and thus does not limit the present invention.

Drive Power Control Device for Electric Vehicle According to First Embodiment

Comparative Example

Figure 2:
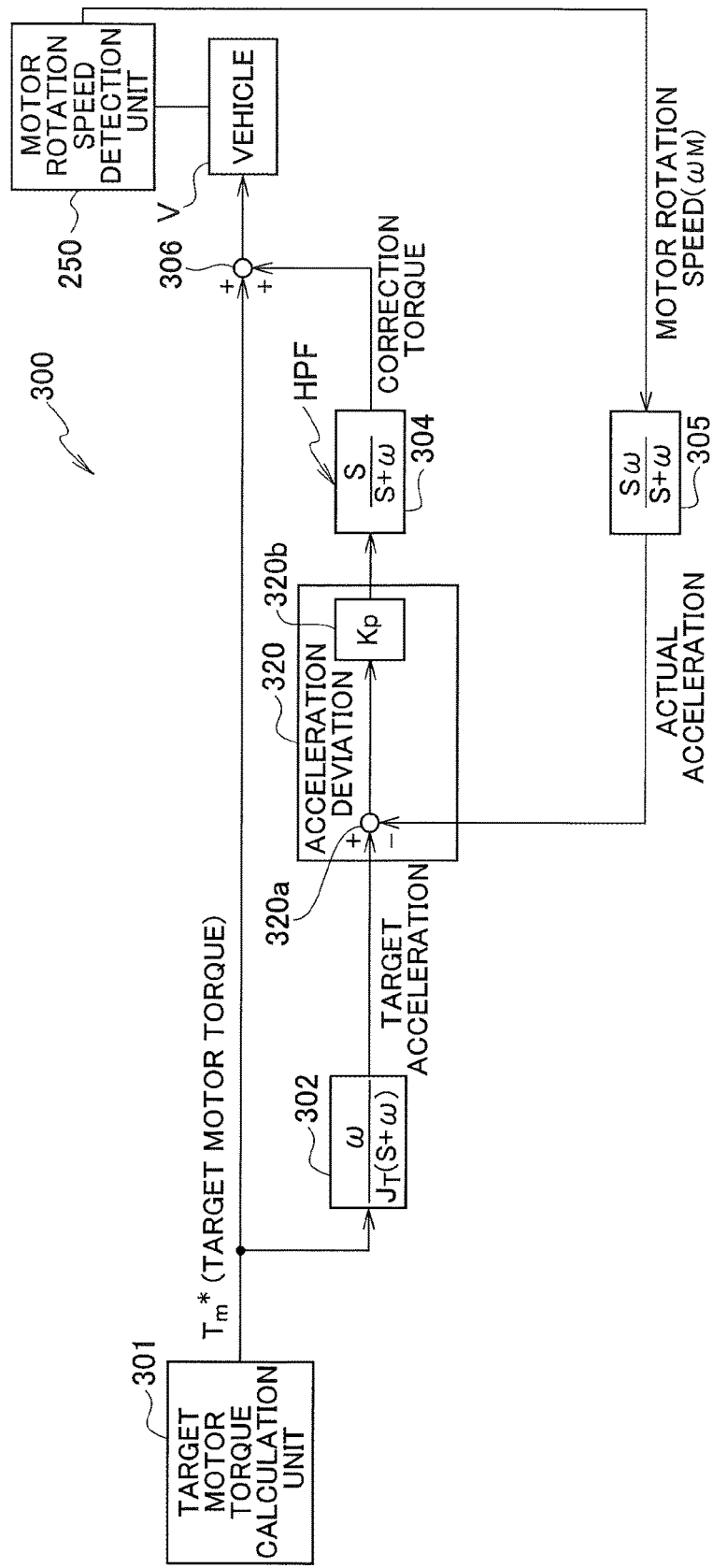
FIG. 2 is a block diagram illustrating an exemplary configuration of a drive power control device for an electric vehicle according to a comparative example.
Figure 3:
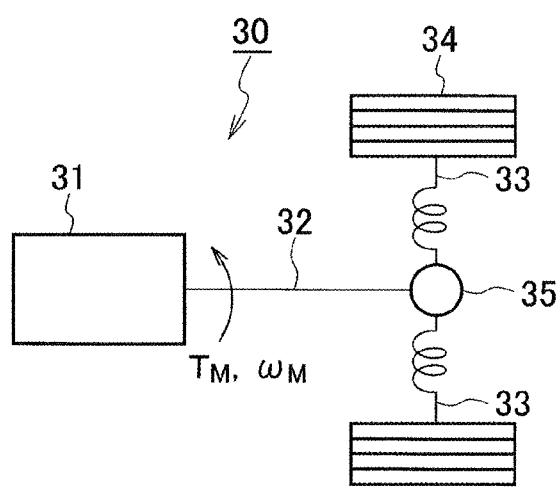
FIG. 3 is a schematic diagram for description of torsional vibration occurring to a drive system.

Before description of a drive power control device 1A for an electric vehicle according to a first embodiment, the following describes, with reference to FIGS. 2 and 3, an exemplary configuration of a drive power control device 300 for an electric vehicle according to a comparative example on which the present invention is based.

FIG. 2 is a block diagram illustrating an exemplary configuration of the drive power control device 300 for the electric vehicle according to the comparative example. FIG. 3 is a schematic diagram for description of torsional vibration occurring to a drive system 30.

The drive power control device 300 for the electric vehicle according to the comparative example is mounted on a vehicle V such as an electric vehicle.

The drive power control device 300 for the electric vehicle according to the comparative example performs vibration reduction control of the vehicle V or the like.

As illustrated in the block diagram of FIG. 2, the drive power control device 300 for the electric vehicle according to the comparative example includes: a target motor torque calculation unit 301 configured to calculate a target motor torque based on an acceleration pedal operation by a driver; a target acceleration calculation unit 302 configured to calculate a target acceleration by dividing the target motor torque by an inertia of a drive system; a motor rotation speed detection unit 250 (for example, a motor rotation speed detection sensor included in the vehicle V) configured to detect an actual motor rotation speed; an actual acceleration calculation unit 305 configured to calculate an actual acceleration by differentiating the motor rotation speed; a correction amount calculation unit 320 configured to calculate a correction amount for the motor torque command value so that a deviation between the target acceleration and the actual acceleration is reduced; a modeling error reduction unit 304 configured to reduce a modeling error of the drive system by passing, through a high-pass filter HPF, the correction amount calculated by the correction amount calculation unit 320; and a motor torque command value calculation unit 306 configured to calculate a final motor torque command value by adding the correction amount to the motor torque command value.

Each unit of the drive power control device 300 for the electric vehicle can be achieved by a central processing unit (CPU), a memory, a calculation circuit, and the like.

The vehicle V includes the drive system 30 as illustrated in FIG. 3.

As illustrated in FIG. 3, the drive system 30 includes a motor 31 as a drive source, and a wheel 34 coupled with the motor 31 through an output shaft 32, a reduction gear 35, and a drive shaft 33.

Rotation of the motor 31 is controlled by a motor torque command value TM calculated by the motor torque command value calculation unit 306 illustrated in FIG. 2 and finally applied to control.

In the drive system 30 of the vehicle V, when the motor 31 is rotated, vibration (torsional vibration) occurs due to torsion of the drive shaft 33.

In FIG. 3, a spring shape schematically illustrates the "torsion" of the drive shaft 33.

To reduce the torsional vibration, correction is performed when the motor torque command value calculation unit 306 calculates the motor torque command value.

The target motor torque calculation unit 301 illustrated in FIG. 2 calculates a target motor torque Tm* based on an acceleration pedal operation by the driver.

The target motor torque Tm* is transferred to the control motor torque command value calculation unit 306 and the target acceleration calculation unit 302.

The target acceleration calculation unit 302 calculates a target acceleration (ideal acceleration) by dividing the target motor torque Tm* by the inertia of the drive system.

The correction amount calculation unit 320 includes a deviation calculation unit 320a and a proportional control unit 320b.

The correction amount calculation unit 320 is connected with the modeling error reduction unit 304 including the high-pass filter HPF serving as a disturbance removal unit.

The deviation calculation unit 320a subtracts an actual acceleration from the target acceleration calculated by the target acceleration calculation unit 302. The actual acceleration is calculated by differentiating, through the actual acceleration calculation unit 305, a motor rotational speed ωM detected by the motor rotation speed detection unit 250. Through the subtraction, the deviation calculation unit 320a calculates a deviation between the target acceleration and the actual acceleration.

The deviation between the target acceleration and the actual acceleration is then input to the proportional control unit 320b.

The proportional control unit 320b calculates a correction amount for reducing the torsional vibration occurring to the drive system 30 by multiplying, with a predetermined proportional gain Kp, the deviation calculated by the deviation calculation unit 320a. The proportional gain Kp may be set as appropriate.

The correction amount eliminates or reduces the deviation between the target acceleration and the actual acceleration. The correction amount is input to the high-pass filter HPF.

The modeling error reduction unit 304 reduces a modeling error of the drive system 30 by passing, through the high-pass filter HPF, the correction amount calculated by the correction amount calculation unit 320.

The motor torque command value calculation unit 306 calculates the final motor torque command value TM [Nm] of the motor 31 driving the vehicle V by adding, to a target motor torque command value, a correction amount (correction torque) obtained by removing any disturbance torque component through the high-pass filter HPF.

The motor 31 is rotated to generate motor torque matching or following the motor torque command value TM, and then the motor torque is input to the drive system 30.

In this manner, the drive power control device 300 for the electric vehicle according to the comparative example performs torsional vibration reduction control.

As described above, the drive power control device 300 for the electric vehicle according to the comparative example relates to a technology of reducing the "torsional vibration" occurring when the vehicle V is traveling. The present inventor considers application of the vibration reduction control by the drive power control device 300 for the electric vehicle to reduction of slip occurring when the vehicle V starts traveling or while the vehicle V is traveling, thereby achieving the present invention.

Figure 1:
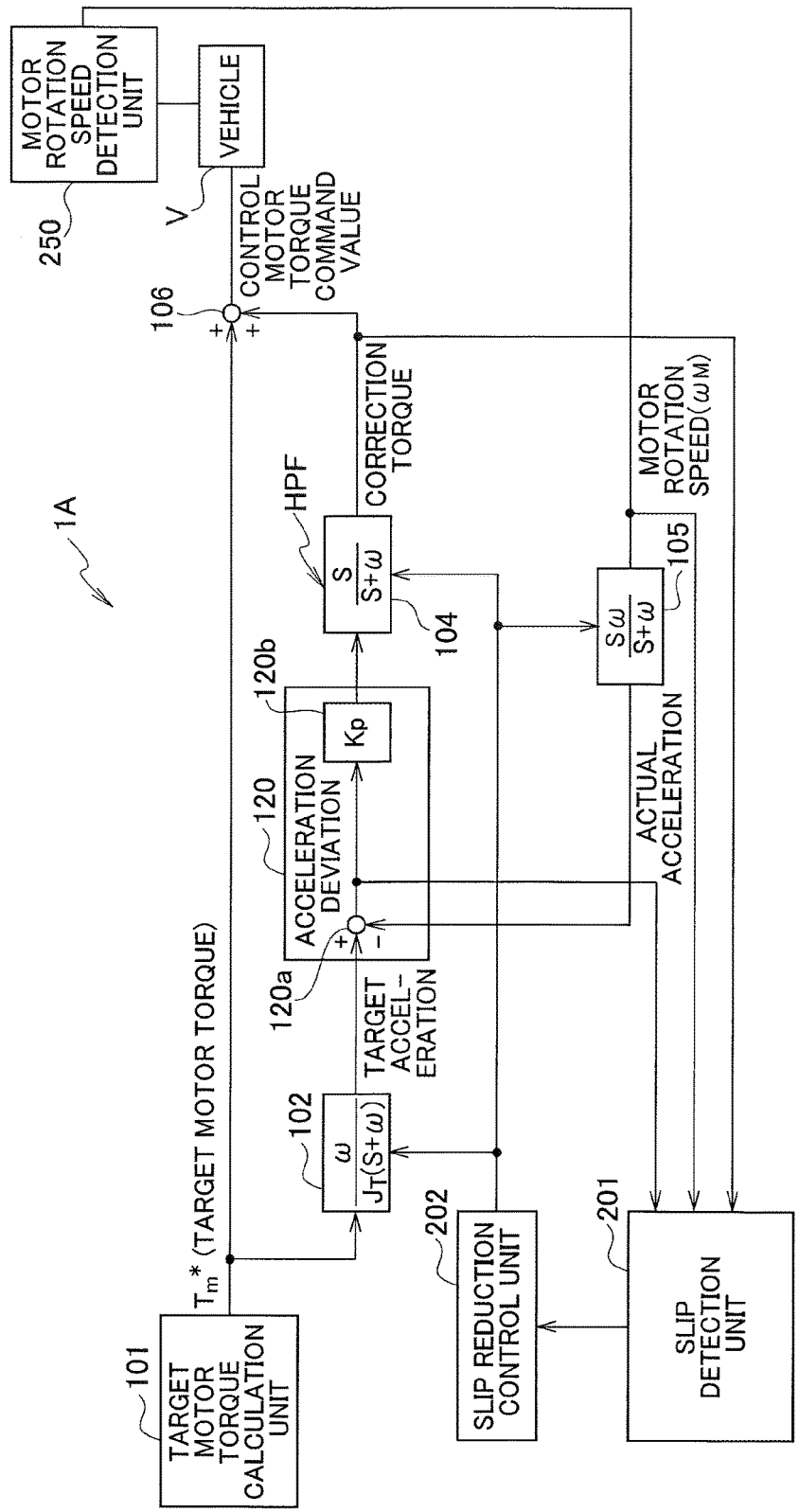
FIG. 1 is a block diagram illustrating an exemplary configuration of a drive power control device for an electric vehicle according to a first embodiment.

Configuration of Drive Power Control Device for Electric Vehicle According to First Embodiment The following describes an exemplary configuration of the drive power control device 1A for the electric vehicle according to the first embodiment with reference to FIG. 1 and FIG. 3 described above.

Simple description will be made on, for example, the principle of slip reduction by the drive power control device 1A for the electric vehicle according to the first embodiment.

Motor torque not causing slip needs to be applied to reduce slip. Thus, the "slip reduction control" is determination of a torque command value not causing slip.

When a predetermined cutoff frequency ω is set at the slip reduction control, correction torque having a low frequency for slip reduction passes through the high-pass filter, and slip is reduced accordingly.

When a vibration reduction control cutoff frequency ω is set instead, the correction torque for slip reduction does not pass through the high-pass filter, and slip is not reduced. In this manner, when the vibration reduction control cutoff frequency is set, only correction torque having a frequency for torsional vibration reduction passes through the high-pass filter.

Determination of a final torque command value is performed by a motor controller. Thus, the motor controller can finally determine a torque command value commanded to the motor, and thus can perform processing of the slip reduction control.

FIG. 1 is a block diagram illustrating an exemplary configuration of the drive power control device 1A for the electric vehicle according to the first embodiment.

As illustrated in FIG. 1, the drive power control device 1A for the electric vehicle includes: a target motor torque calculation unit 101 configured to calculate the target motor torque Tm* for the electric vehicle (vehicle V) equipped with the motor 31 (refer to FIG. 3) as a drive source based on an accelerator operation by the driver; a target acceleration calculation unit 102 configured to calculate a target acceleration by dividing the target motor torque Tm* by the inertia of the drive system 30 (refer to FIG. 3) mounted on the vehicle V; the motor rotation speed detection unit (for example, a rotational speed sensor) 250 configured to detect an actual motor rotation speed; an actual acceleration calculation unit 105 configured to calculate an actual acceleration by differentiating the motor rotation speed detected by the motor rotation speed detection unit 250; a correction amount calculation unit 120 configured to calculate a correction amount (correction torque) for a motor torque command value so that a deviation between the target acceleration calculated by the target acceleration calculation unit 102 and the actual acceleration calculated by the actual acceleration calculation unit 105 is reduced; a modeling error reduction unit 104 configured to reduce an error between an ideal vehicle model of the drive system 30 and the actual vehicle by passing, through the high-pass filter HPF, the correction amount calculated by the correction amount calculation unit 120; a control motor torque command value calculation unit 106 configured to calculate a control motor torque command value finally applied to control by adding the correction amount to the motor torque command value; a slip detection unit 201 configured to detect the occurrence of slip based on the correction amount, the control motor torque command value, and the target motor torque; and a slip reduction control unit (cutoff frequency switch unit) 202 configured to perform control to reduce slip by switching the cutoff frequency of the high-pass filter HPF in accordance with a result of the detection by the slip detection unit 201.

The motor rotation speed detection unit 250 is connected with the actual acceleration calculation unit 105 to input the motor rotation speed to the actual acceleration calculation unit 105.

Each unit of the drive power control device 1A for the electric vehicle can be achieved by a central processing unit (CPU), a memory, a calculation circuit, and the like.

The slip reduction control unit (cutoff frequency switch unit) 202 may generate a cutoff frequency of the high-pass filter HPF for allowing slip reduction in accordance with a result of the detection by the slip detection unit 201, and select the generated cutoff frequency, or may store a plurality of cutoff frequencies in advance and select a cutoff frequency effective for slip reduction from among the stored frequencies.

As indicated by comparison between FIGS. 1 and 2, the configuration of the drive power control device 1A for the electric vehicle according to the first embodiment is different from the configuration of the drive power control device 300 for the electric vehicle according to the comparative example mainly in that the drive power control device 1A for the electric vehicle includes the slip detection unit 201 and the slip reduction control unit 202 configured to perform control to reduce slip in accordance with a result of the detection by the slip detection unit 201.

In the present embodiment, the slip detection unit 201 also functions to determine a condition on whether the slip reduction control or the torsional vibration reduction control is performed based on the correction amount, the control motor torque command value, and the target motor torque.

Thus, the drive power control device 1A for the electric vehicle according to the present Example further includes the slip detection unit 201 and the slip reduction control unit 202 in addition to the configuration of the drive power control device 300 for the electric vehicle according to the comparative example, and can perform the torsional vibration reduction control similarly to the drive power control device 300 for the electric vehicle.

Accordingly, the drive power control device 1A for the electric vehicle according to the present Example can perform such switching of control configurations that the torsional vibration reduction control is performed during normal traveling of the vehicle V or the slip reduction control is performed by the slip reduction control unit 202 at detection of the occurrence of slip by the slip detection unit 201.

The target motor torque calculation unit 101 illustrated in FIG. 1 calculates the target motor torque Tm* based on an acceleration pedal operation by the driver. The calculated target motor torque Tm* is transferred to the control motor torque command value calculation unit 106 and the target acceleration calculation unit 102.

The target acceleration calculation unit 102 calculates a target acceleration by dividing the target motor torque Tm* by the inertia of the drive system 30.

An ideal vehicle model is assumed to have no backlash in a vehicle drive system and to be a complete rigid body.

The target acceleration calculation unit 102 calculates a target acceleration of the motor in the ideal vehicle model by dividing the target motor torque Tm* by the inertia JT of the drive system.

A transfer function Gm(s) of the ideal vehicle model can be expressed in, for example, Expression (1) below.

$$Gm(s)=\omega/\{JT(s+\omega)\} \quad (1)$$

In the expression, ω [rad/s] represents a cutoff frequency and is set to a value same as the value of ω in Expressions (2) and (3) to be described later.

In Expression (1), JT [Nms2] represents a total inertia (inertia moment) converted along a motor axis, and s represents the Laplace operator.

The inertia moment JT can be set as appropriate in accordance with the kind of a vehicle drive system.

The correction amount calculation unit 120 includes a deviation calculation unit 120a and a proportional control unit 120b.

The correction amount calculation unit 120 is connected with the modeling error reduction unit 104 including the high-pass filter HPF serving as a disturbance removal unit.

The correction amount calculation unit 120 calculates a correction amount for a motor torque command value based on the target acceleration calculated by the target acceleration calculation unit 102 and the actual acceleration calculated by the actual acceleration calculation unit 105.

The correction amount is used to reduce slip, and is calculated so that the deviation between the target acceleration and the actual acceleration is eliminated or reduced.

The correction amount calculated by the correction amount calculation unit 120 is input to the high-pass filter HPF.

The deviation calculation unit 120a subtracts an actual acceleration from the target acceleration calculated by the target acceleration calculation unit 102. The actual acceleration is calculated by differentiating, through the actual acceleration calculation unit 105, the motor rotational speed ωM detected by the motor rotation speed detection unit 250. Through the subtraction, the deviation calculation unit 120a calculates the deviation between the target acceleration and the actual acceleration. The motor rotation speed detection unit 250 calculates the motor rotational speed ωM based on a signal received from a resolver (not illustrated).

The high-pass filter HPF removes any disturbance torque component by performing dynamic correction processing (high-pass filter processing) on the correction amount calculated by the proportional control unit 120b.

In the present embodiment, examples of disturbance torque components removable through the high-pass filter HPF include a travel resistance torque component such as air resistance, and a braking torque component due to a brake operation.

The high-pass filter HPF removes any disturbance torque component included in the correction amount by transmitting the high frequency side of the correction amount while blocking the low frequency side thereof, thereby calculating a final correction amount.

The high-pass filter HPF can employ a transfer function Gh(s) as expressed in Expression (2) below.

$$Gh(s)=s/(s+\omega) \quad (2)$$

In Expression (2), s represents the Laplace operator, and ω [rad/s] represents a cutoff frequency.

For example, slip that is likely to occur at start of traveling of the vehicle can be reduced by setting the constant ω of the high-pass filter HPF to be smaller than the constant ω at the vibration reduction control. Such control is referred to as "slip reduction control" in the present embodiment.

The constant ω at the slip reduction control is, for example, 0.01 rad/s.

At the torsional vibration reduction control during normal traveling, the constant ω of the high-pass filter HPF is set to be smaller than a torsional vibration frequency. For example, when the torsional vibration frequency is ω=15 rad/s, the constant ω of the high-pass filter HPF is preferably set to 10 rad/s.

The actual acceleration calculation unit 105 calculates an actual rotational acceleration (actual acceleration) by differentiating an actual rotational speed ωM [rad/s] of the motor 31 inside the drive system 30 detected by the rotation speed detection unit 250.

The transfer characteristic (transfer function) Ga(s) of the actual acceleration calculation unit 105 can be expressed in, for example, Expression (3) below.

$$Ga(s)=s\Omega/(s+\Omega) \quad (3)$$

In the expression, ω [rad/s] represents the cutoff frequency of the high-pass filter HPF synthesized through equivalent conversion, and s represents the Laplace operator.

The actual acceleration is input to the correction amount calculation unit 120.

The term ω/(s+ω) included in the transfer function Ga(s) provides a delay same as that of the term ω/(s+ω) included in the transfer function Gm(s) described above.

The modeling error reduction unit 104 reduces the modeling error of the drive system 30 by passing, through the high-pass filter HPF (by performing high-pass filter processing on), the correction amount calculated by the correction amount calculation unit 120.

The control motor torque command value calculation unit 106 calculates a final control motor torque command value TM [Nm] for the motor 31 driving the vehicle V by adding, to the target motor torque command value, a correction amount (correction torque) obtained by removing any disturbance torque component through the high-pass filter HPF.

The motor 31 is rotated to generate motor torque matching or following the motor torque command value TM, and then the motor torque is input to the drive system 30.

Such control achieves effective reduction of slip of the vehicle V at detection.

The slip reduction control unit 202 can perform control to start the slip reduction control when the motor rotation speed is lower than a first predetermined value ω0 at start of traveling of the vehicle V.

This enables reliable detection of a state in which the slip reduction control is effective, and allows the slip reduction control to be started at an appropriate timing.

Alternatively, the slip reduction control unit 202 may perform control to start the slip reduction control when such three conditions that the motor rotation speed is not lower than the first predetermined value ω0, an acceleration deviation is smaller than a first predetermined value ae1, and the absolute value of the correction torque is smaller than a second predetermined value T2 are satisfied during traveling of the vehicle V.

This enables reliable detection of a state in which the slip reduction control is effective, and allows the slip reduction control to be started at an appropriate timing.

The slip reduction control unit 202 may perform control to end the slip reduction control when the motor rotation speed exceeds a second predetermined value ω1 and the absolute value of the correction torque is smaller than a first predetermined value T1.

This allows the slip reduction control to be ended at an appropriate timing.

Alternatively, the slip reduction control unit 202 may perform control to end the slip reduction control when such three conditions that the motor rotation speed is not lower than the first predetermined value ω0, the absolute value of the acceleration deviation is smaller than a second predetermined value ae2, and the absolute value of the correction torque is smaller than the first predetermined value T1 are satisfied during traveling of the vehicle V.

This allows the slip reduction control to be ended at an appropriate timing.

Drive Power Control Device for Electric Vehicle According to Second Embodiment

Figure 4:
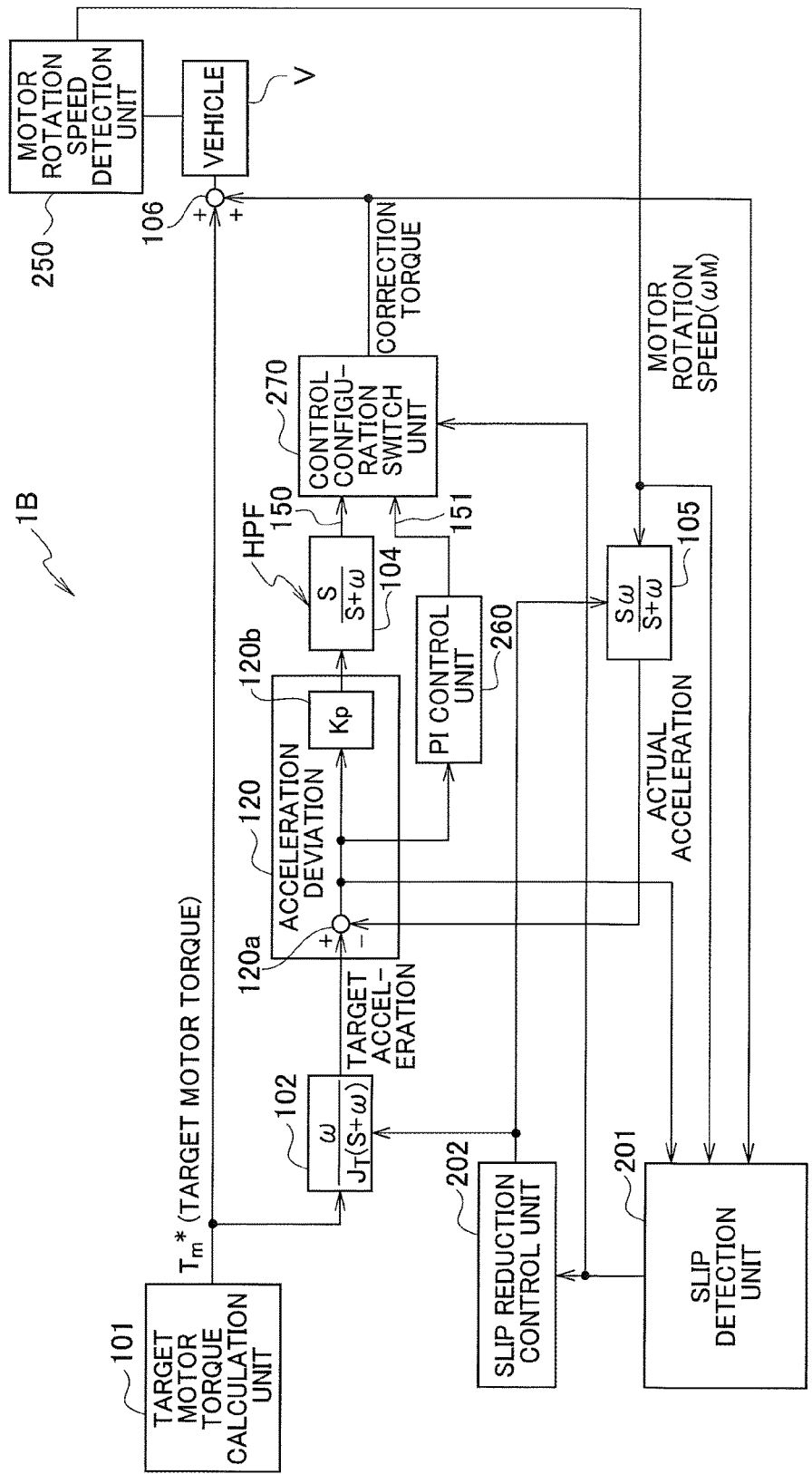
FIG. 4 is a block diagram illustrating an exemplary configuration of a drive power control device for an electric vehicle according to a second embodiment.

The following describes, with reference to FIG. 4 and FIG. 3 described above, an exemplary configuration of a drive power control device 1B for an electric vehicle according to a second embodiment.

FIG. 4 is a block diagram illustrating an exemplary configuration of the drive power control device 1B for the electric vehicle according to the second embodiment.

Any component identical to that in the drive power control device 1A for the electric vehicle according to the first embodiment is denoted by an identical reference sign, and any duplicate description is omitted.

The configuration of the drive power control device 1B for the electric vehicle according to the second embodiment is different from the configuration of the drive power control device 1A for the electric vehicle according to the first embodiment mainly in that the drive power control device 1B includes a PI control unit 260 configured to control, through PI control (proportional-integral control), arithmetic processing of a correction amount at the correction amount calculation unit 120, and a control configuration switch unit 270 configured to perform switching between the torsional vibration reduction control and the slip reduction control.

Each unit of the drive power control device 1B for the electric vehicle can be achieved by a central processing unit (CPU), a memory, a calculation circuit, and the like.

The control configuration switch unit 270 switches the control configuration to a slip reduction control configuration based on an input from a signal line 151 when performing the slip reduction control. The control configuration switch unit 270 switches the control configuration to a torsional vibration reduction control configuration based on an input from a signal line 150 when performing the torsional vibration reduction control.

In the drive power control device 1B for the electric vehicle according to the present embodiment, for example, when the slip reduction control is performed in place of the torsional vibration reduction control, the slip reduction control unit 202 can perform control to switch control of arithmetic processing of a correction amount at the correction amount calculation unit 120 from P control (proportional control) to the PI control (proportional-integral control) executed by the PI control unit 260.

Thus, control can be performed with the control configuration being switched to the PI control unit 260 achieved by any other software in place of the proportional control unit 120b achieved by predetermined software or the like.

Accordingly, an improved slip reduction effect can be achieved. Specifically, the ideal acceleration and the actual acceleration have a deviation therebetween when the constant ω is changed in the P control, but the deviation can be eliminated in the PI control by the PI control unit 260, thereby more effectively reducing the amount of slip.

In the present embodiment, the slip detection unit 201 also functions to determine a condition on whether the slip reduction control or the torsional vibration reduction control is performed based on the correction amount, the control motor torque command value, and the target motor torque.

The following describes, for example, the order of control processing at the drive power control device 1B for the electric vehicle with reference to FIG. 4.

The drive power control device 1B for the electric vehicle according to the second embodiment has a configuration same as that of the drive power control device 300 for the electric vehicle according to the comparative example. Accordingly, the drive power control device 1B for the electric vehicle can perform the torsional vibration reduction control.

Specifically, the drive power control device 1B for the electric vehicle according to the present Example can perform such switching that the torsional vibration reduction control is performed during normal traveling of the vehicle V or the slip reduction control is performed by the slip reduction control unit 202 at detection of the occurrence of slip by the slip detection unit 201.

The target motor torque calculation unit 101 calculates the target motor torque Tm* based on an acceleration pedal operation by the driver. The calculated target motor torque Tm* is transferred to the control motor torque command value calculation unit 106, the target acceleration calculation unit 102, and the slip detection unit 201.

The slip detection unit 201 detects the occurrence of slip based on the amount of acceleration deviation, the correction torque, and the motor rotation speed.

When slip is detected by the slip detection unit 201, the slip reduction control unit 202 executes the slip reduction control.

The target acceleration calculation unit 102 calculates a target acceleration (ideal acceleration) by dividing the target motor torque Tm* by the inertia of the drive system 30.

The target acceleration calculation unit 102 calculates a target acceleration of the motor in the ideal vehicle model by dividing the target motor torque Tm* by the inertia JT of the drive system.

The transfer function Gm(s) of the ideal vehicle model is given by Expression (1) in the description of the drive power control device 1A for the electric vehicle according to the first embodiment.

The actual acceleration calculation unit 105 calculates an actual rotational acceleration (actual acceleration) by differentiating the actual rotational speed ωM [rad/s] of the motor 31 inside the drive system 30 detected by the rotation speed detection unit 250.

The transfer characteristic (transfer function) Ga(s) of the actual acceleration calculation unit 105 is given by Expression (3) in the description of the drive power control device 1A for the electric vehicle.

The actual acceleration is input to the correction amount calculation unit 120.

The term ω/(s+ω) included in the transfer function Ga(s) provides a delay same as that of the term ω/(s+ω) included in the transfer function Gm(s) described above.

The correction amount calculation unit 120 includes the deviation calculation unit 120a and the proportional control unit 120b.

The correction amount calculation unit 120 is connected with the modeling error reduction unit 104 including the high-pass filter HPF serving as a disturbance removal unit.

The correction amount calculation unit 120 calculates a correction amount for a motor torque command value based on the target acceleration calculated by the target acceleration calculation unit 102 and the actual acceleration calculated by the actual acceleration calculation unit 105.

The correction amount is used to reduce slip, and is calculated so that the deviation between the target acceleration and the actual acceleration is eliminated or reduced.

The correction amount calculated by the correction amount calculation unit 120 is input to the high-pass filter HPF.

The deviation calculation unit 120a calculates the deviation between the target acceleration and the actual acceleration by subtracting an actual acceleration from the target acceleration calculated by the target acceleration calculation unit 102. The actual acceleration is calculated by differentiating, through the actual acceleration calculation unit 105, the motor rotational speed ωM detected by the motor rotation speed detection unit 250.

The high-pass filter HPF removes any disturbance torque component by performing dynamic correction processing (filter processing) on the correction amount calculated by the proportional control unit 120b.

The high-pass filter HPF removes any disturbance torque component included in the correction amount by transmitting the high frequency side of the correction amount while blocking the low frequency side thereof, thereby calculating a final correction amount.

The high-pass filter HPF can employ the transfer function Gh(s) given by Expression (2) in the description of the drive power control device 1A for the electric vehicle.

For example, slip that is likely to occur at start of traveling of the vehicle can be reduced by setting the constant ω of the high-pass filter HPF to be smaller than the constant ω at the vibration reduction control.

The constant ω at the slip reduction control is, for example, 0.01 rad/s.

At the torsional vibration reduction control during normal traveling, the constant ω of the high-pass filter HPF is set to be smaller than the torsional vibration frequency. For example, when the torsional vibration frequency is ω=15 rad/s, the constant ω of the high-pass filter HPF is preferably set to 10 rad/s.

The arithmetic processing of a correction amount is switched from the proportional control unit 120b to the PI control unit 260 as appropriate under control of the slip reduction control unit 202.

The PI control by the PI control unit 260 can eliminate the deviation between the ideal acceleration and the actual acceleration, thereby more effectively reducing the amount of slip.

The modeling error reduction unit 104 reduces the modeling error of the drive system 30 by passing, through the high-pass filter HPF, the correction amount calculated by the correction amount calculation unit 120.

The control configuration switch unit 270 performs switching between the torsional vibration reduction control and the slip reduction control as appropriate based on results output from the modeling error reduction unit 104, the PI control unit 260, and the slip detection unit 201.

For example, switching conditions for starting and ending the torsional vibration reduction control and the slip reduction control are same as those for the drive power control device 1A for the electric vehicle according to the first embodiment. The procedure of processing will be described later with reference to a flowchart illustrated in FIG. 5.

The control motor torque command value calculation unit 106 calculates the final control motor torque command value TM [Nm] for the motor 31 driving the vehicle V by adding, to the target motor torque command value, a correction amount (correction torque) obtained by removing any disturbance torque component through the high-pass filter HPF.

The control motor torque command value TM is input to the drive system 30 as illustrated in FIG. 3 described above, and the motor 31 is rotated to generate motor torque matching or following the motor torque command value TM.

Such control achieves effective reduction of slip of the vehicle V at detection.

[Slip Reduction Processing]

Figure 5:
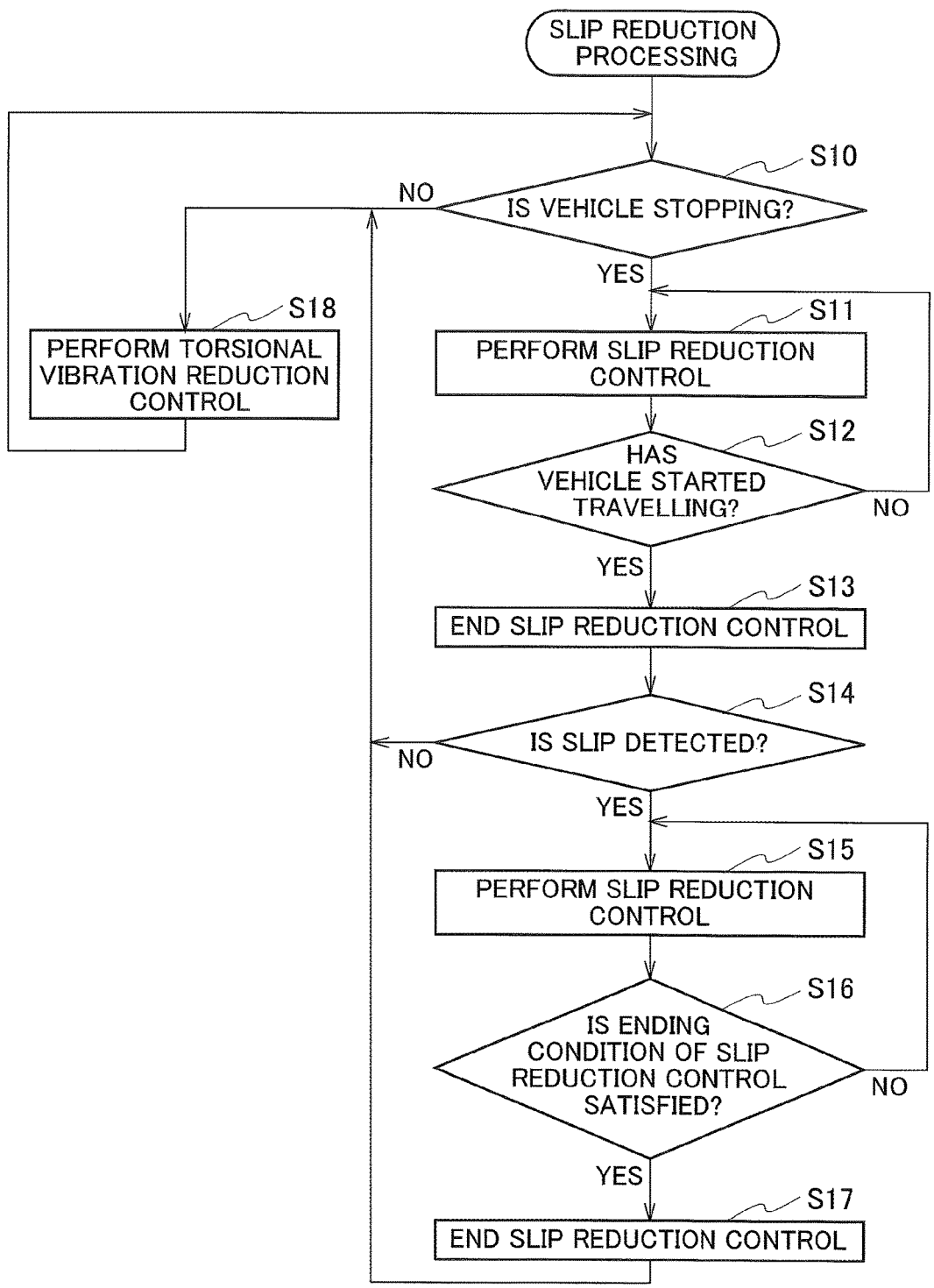
FIG. 5 is a flowchart illustrating a procedure of slip reduction processing executed by a drive power control device for an electric vehicle according to the embodiments.

The following describes, with reference to the flowchart illustrated in FIG. 5, the procedure of slip reduction processing executed by the drive power control device 1A for the electric vehicle according to the first embodiment and the drive power control device 1B for the electric vehicle according to the second embodiment described above.

It is assumed that an ignition switch of the vehicle V is turned on and the vehicle V is ready to start traveling.

Simply stated, the slip reduction processing performs the slip reduction control when the vehicle V is stopping or slip is detected, and performs the torsional vibration reduction control otherwise.

When the present processing is started, it is first determined at step S10 whether the vehicle V is stopping. Specifically, for example, it is determined whether the motor rotation speed is zero or lower than the first predetermined value ω0. If the determination provides "No", the process proceeds to step S18 to perform the torsional vibration reduction control.

The torsional vibration reduction control executes, for example, processing to set the constant ω of the high-pass filter HPF to a value that allows passing of the torsional vibration frequency only (for example, ω=10 rad/s).

The vibration reduction control continues, for example, until the vehicle V stops at a traffic light, thereby reducing torsional vibration during traveling of the vehicle V.

If the determination at step S10 provides "Yes", the process proceeds to step S11 to perform the slip reduction control.

The slip reduction control executes processing to set the constant ω of the high-pass filter HPF to be, for example, 0.01 rad/s so that the effect of the high-pass filter HPF is eliminated.

This achieves reduction of slip at start of traveling of the vehicle V.

Subsequently at step S12, it is determined whether the vehicle V has started traveling.

Specifically, it is determined whether the motor rotation speed is not lower than the first predetermined value ω0. If the determination provides "No", the process returns to step S11 to continue the slip reduction control. If the determination provides "Yes", the process proceeds to step S13 to end the slip reduction control.

Control to end the slip reduction control may be performed, instead of the above-described condition, when the motor rotation speed exceeds the second predetermined value ω1 and the absolute value of the correction torque is smaller than the first predetermined value T1.

Subsequently at step S14, it is determined whether slip is detected.

The determination may be based on a condition that the acceleration deviation is not larger than a threshold (ae1) and the absolute value of the correction torque is not larger than a threshold (T1).

When slip occurs during traveling in the vibration reduction control, the actual acceleration abruptly becomes larger than the ideal acceleration, and the acceleration deviation becomes negatively large accordingly.

The acceleration deviation is cut through the high-pass filter HPF, and thus does not appear in the correction torque. It is determined based on these conditions that slip is occurring.

If the determination at step S14 provides "No", the process proceeds to step S18 to perform the torsional vibration reduction control.

If the determination at step S14 provides "Yes", the process proceeds to step S15 to perform the slip reduction control.

The slip reduction control executes processing to set the constant ω of the high-pass filter HPF to be, for example, 0.01 rad/s so that the effect of the high-pass filter HPF is eliminated.

Accordingly, slip can be reduced while the vehicle V is traveling on, for example, a low μ road.

Subsequently at step S16, it is determined whether an ending condition of the slip reduction control is satisfied.

The ending condition of the slip reduction control may be such that the absolute value of the acceleration deviation is not larger than a threshold (ae2) and the absolute value of the correction torque is not larger than a threshold (T1).

Specifically, when slip reduction is performed on a low μ road by the slip reduction control, the correction torque needs a correction amount for reducing slip, and thus is large.

However, the correction amount for reducing slip is not needed on a high μ road, and thus the correction torque decreases and the acceleration deviation decreases accordingly. It can be determined on these conditions that the vehicle is traveling on a high μ road where the slip reduction control can be ended.

If the above-described conditions are satisfied, the process proceeds to step S17 to end the slip reduction control, and then the process proceeds to step S18 to perform switching to the vibration reduction control. The processing at steps S14 to S17 may be performed following step S18.

Switching can be performed through such processing at an appropriate timing between the slip reduction control and the torsional vibration reduction control.

[Simulation Result]

The following describes simulation results by the drive power control devices 1A and 1B for an electric vehicle according to the present Example with reference to graphs illustrated in FIGS. 6 to 11.

Figure 6:
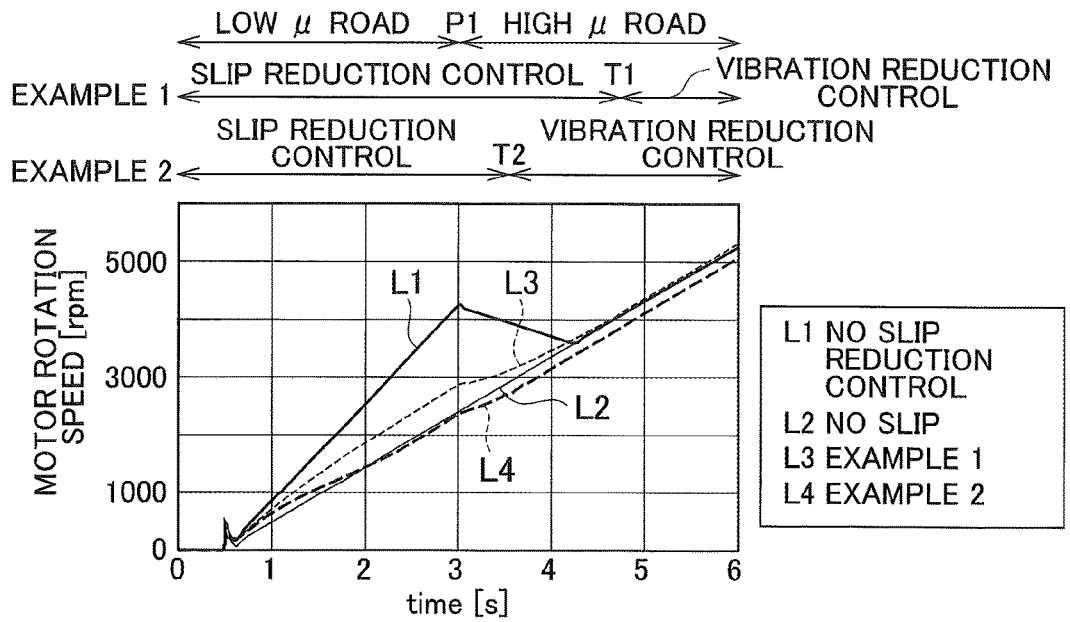
FIG. 6 is a graph illustrating a simulation result related to a motor rotation speed at start of traveling.
Figure 7:
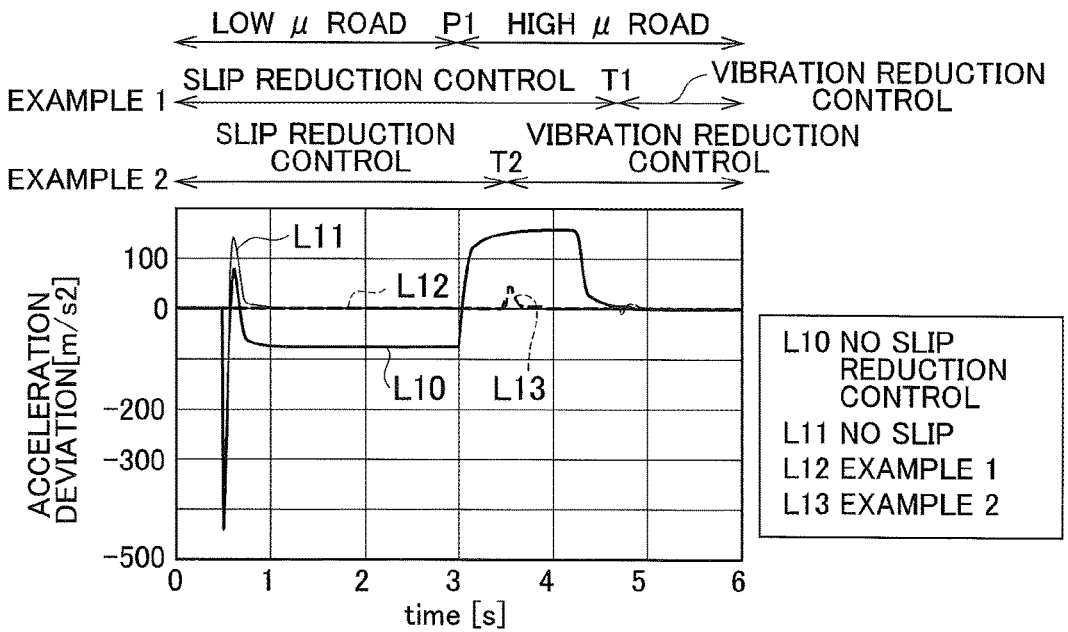
FIG. 7 is a graph illustrating a simulation result related to an acceleration deviation at start of traveling.
Figure 8:
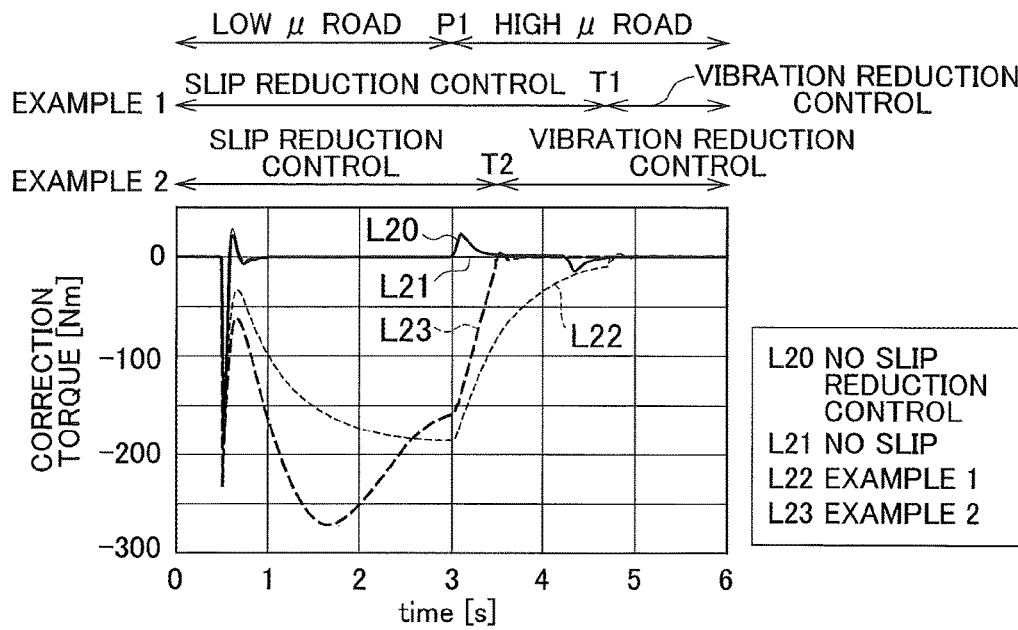
FIG. 8 is a graph illustrating a simulation result related to a correction torque at start of traveling.

FIG. 6 is a graph illustrating a simulation result related to the motor rotation speed at start of traveling. FIG. 7 is a graph illustrating a simulation result related to the acceleration deviation at start of traveling. FIG. 8 is a graph illustrating a simulation result related to the correction torque at start of traveling.

The simulations at start of traveling illustrated in FIGS. 6 to 8 assume that a road surface switches from a low μ road (low-friction road) to a high μ road (high-friction road) at point P1.

Simulation at start of traveling was performed in Example 1 in which control switches from the slip reduction control (P control) to the torsional vibration reduction control at timing T1, and Example 2 in which control switches from the slip reduction control (PI control) to the torsional vibration reduction control at timing T2.

In the graph illustrated in FIG. 6, line L1 corresponds to a state with no slip reduction control, line L2 corresponds to a state with no slip, line L3 corresponds to Example 1, and line L4 corresponds to Example 2.

In the graph illustrated in FIG. 7, line L10 corresponds to a state with no slip reduction control, line L11 corresponds to a state with no slip, line L12 corresponds to Example 1, and line L13 corresponds to Example 2.

In the graph illustrated in FIG. 8, line L20 corresponds to a state with no slip reduction control, line L21 corresponds to a state with no slip, line L22 corresponds to Example 1, and line L23 corresponds to Example 2.

"No slip" refers to a result of simulation entirely performed on a high μ road, and indicates the motor rotation speed when no slip is occurring.

It can be determined that no slip is occurring when the road surface is a low μ road and the motor rotation speed is close to a rotation speed when no slip is occurring.

In the graphs illustrated in FIGS. 5 to 8, the motor rotation speed in the simulation result of "no reduction control" largely deviates from that of "no slip", which indicates that slip is occurring.

However, slip in the simulation result of Example 1 was reduced as compared with that of "no reduction control" after the first second at which "slip reduction control" was turned on.

Since the simulation of Example 1 was performed by the P control, the rotation speed in this simulation deviated from that of "no slip".

Since the simulation of Example 2 was performed by the PI control, slip in this simulation was further reduced as compared with that of Example 1.

Figure 9:
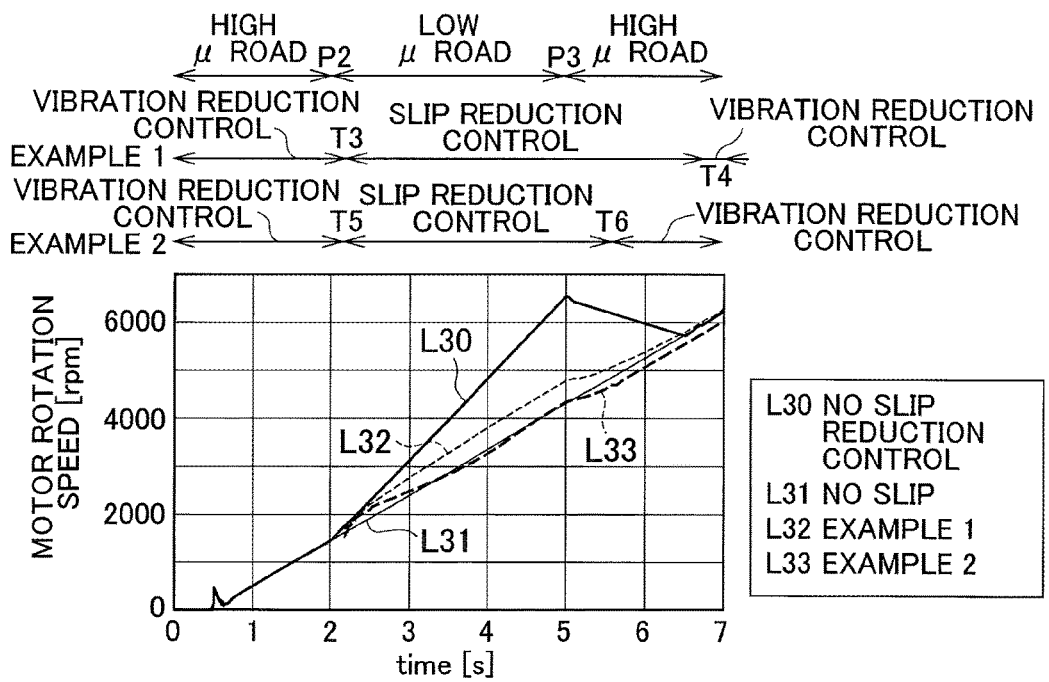
FIG. 9 is a graph illustrating a simulation result related to the motor rotation speed during traveling.
Figure 10:
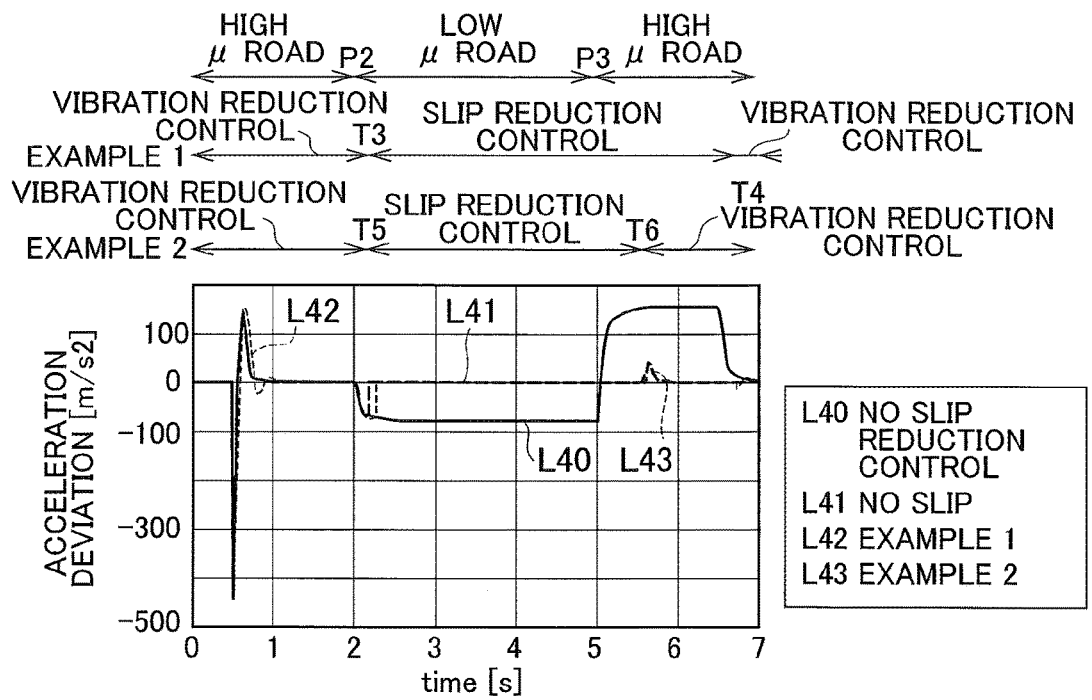
FIG. 10 is a graph illustrating a simulation result related to the acceleration deviation during traveling.
Figure 11:
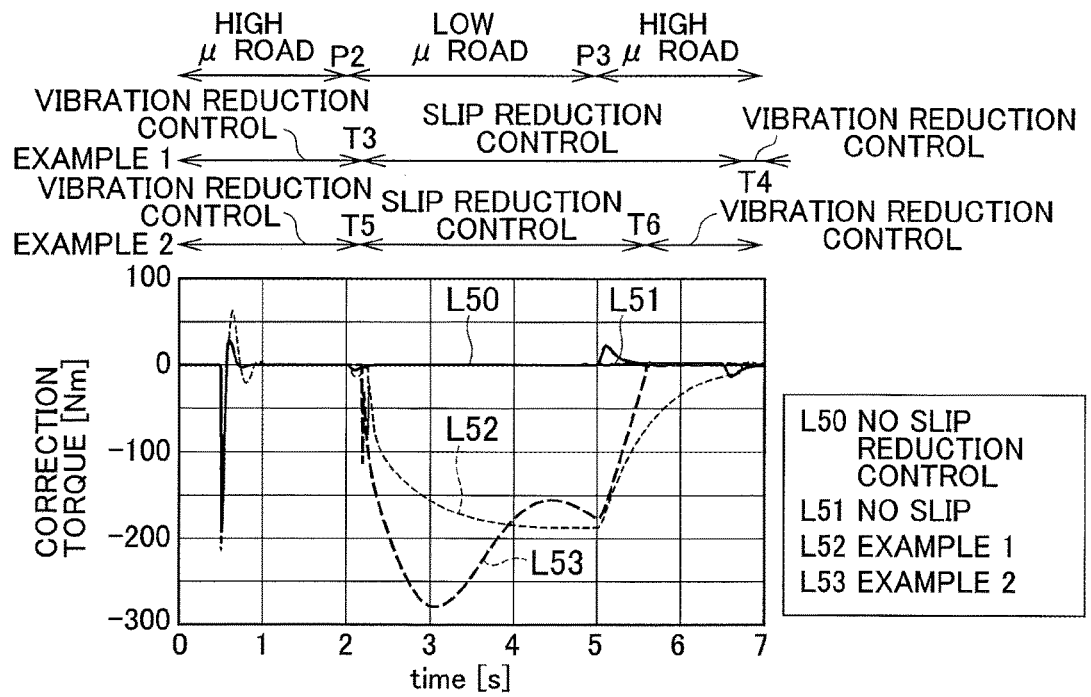
FIG. 11 is a graph illustrating a simulation result related to the correction torque during traveling.

FIG. 9 is a graph illustrating a simulation result related to the motor rotation speed during traveling. FIG. 10 is a graph illustrating a simulation result related to the acceleration deviation during traveling. FIG. 11 is a graph illustrating a simulation result related to the correction torque during traveling.

The simulations during traveling illustrated in FIGS. 9 to 11 assume that a road surface switches from a high μ road (high-friction road) to a low μ road (low-friction road) at point P2, and then switches from the low μ road to the high μ road at point P3.

Simulation at start of traveling was performed in Example 1 in which control switches from the torsional vibration reduction control to the slip reduction control (P control) at timing T3 and then switches back to the torsional vibration reduction control again at timing T4, and Example 2 in which control switches from the torsional vibration reduction control to the slip reduction control (P control) at timing T5 and then switches back to the torsional vibration reduction control again at timing T6.

In the graph illustrated in FIG. 9, line L30 corresponds to a state with no slip reduction control, line L31 corresponds to a state with no slip, line L32 corresponds to Example 1, and line L33 corresponds to Example 2.

In the graph illustrated in FIG. 10, line L40 corresponds to a state with no slip reduction control, line L41 corresponds to a state with no slip, line L42 corresponds to Example 1, and line L43 corresponds to Example 2.

In the graph illustrated in FIG. 11, line L50 corresponds to a state with no slip reduction control, line L51 corresponds to a state with no slip, line L52 corresponds to Example 1, and line L53 corresponds to Example 2.

In the graphs illustrated in FIGS. 9 to 11, the motor rotation speed in the simulation result of "no reduction control" largely deviates from that of "no slip", which indicates that slip is occurring.

However, slip in the simulation result of Example 1 was reduced as compared with that of "no reduction control" after the first second at which "slip reduction control" was turned on.

Since the simulation of Example 1 is performed by the P control, the rotation speed in this simulation deviated from that of "no slip".

Since the simulation of Example 2 was performed by the PI control, slip was further reduced as compared with that of Example 1.

Drive Power Control Device for Electric Vehicle According to Third Embodiment

Figure 12:
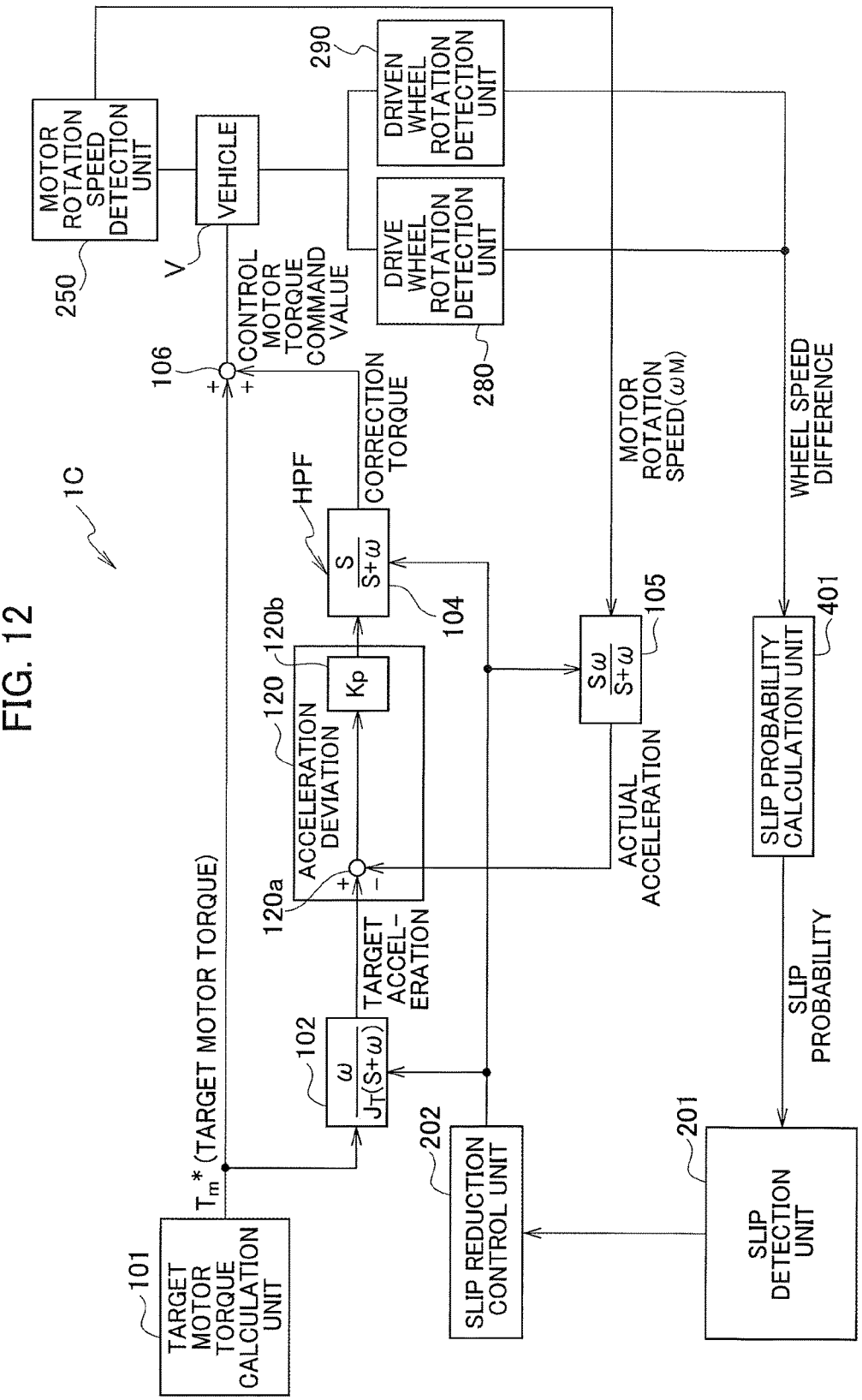
FIG. 12 is a block diagram illustrating an exemplary configuration of a drive power control device for an electric vehicle according to a third embodiment.

The following describes the configuration of a drive power control device 1C for an electric vehicle according to a third embodiment with reference to FIG. 12.

The third embodiment differs from the first embodiment in that the drive power control device 1C includes a drive wheel rotation detection unit 280, a driven wheel rotation detection unit 290, and a slip probability calculation unit 401. As another different configuration, the slip detection unit 201 detects the occurrence of slip not based on the amount of acceleration deviation, the correction torque, and the motor rotation speed, but based on a slip probability calculated by the slip probability calculation unit 401. Any component identical to that of the first embodiment is denoted by a reference sign in the first embodiment, and thus a description thereof will be omitted. The following description is mainly made on differences between the embodiments.

For example, the drive wheel rotation detection unit 280 detects a rotation state of a drive wheel provided to the vehicle V based on a signal from a wheel speed sensor of the drive wheel. More specifically, the drive wheel rotation detection unit 280 detects the rotational speed of the drive wheel and outputs the detected rotational speed of the drive wheel to the slip probability calculation unit 401.

For example, the driven wheel rotation detection unit 290 detects the rotation state of a driven wheel provided to the vehicle V based on a signal from a wheel speed sensor of the driven wheel. More specifically, the driven wheel rotation detection unit 290 detects the rotational speed of the driven wheel and outputs the detected rotational speed of the driven wheel to the slip probability calculation unit 401.

The slip probability calculation unit 401 calculates a slip probability based on a deviation between the rotational speed of the drive wheel and the rotational speed of the driven wheel. The slip probability calculation unit 401 outputs the calculated slip probability to the slip detection unit 201.

The slip detection unit 201 detects the occurrence of slip based on the slip probability calculated by the slip probability calculation unit 401. More specifically, the slip detection unit 201 determines that slip is occurring when the slip probability is not larger than a predetermined value. This predetermined value can be obtained through simulation and experiment in advance. For example, the predetermined value can be set to 0.2.

The following describes an effect of detection of the occurrence of slip from the slip probability based on the deviation between the rotational speeds of the drive wheel and the driven wheel. The drive power control device 1A according to the first embodiment detects the occurrence of slip based on the amount of acceleration deviation, the correction torque, and the motor rotation speed. The correction torque, which is based on an ideal vehicle model, is different from an actual torque. Thus, for example, when a light automobile with fully seated travels down a slope, the acceleration thereof potentially becomes larger than an acceleration based on an ideal vehicle model. In such a case, although the vehicle V is not slipping in reality, the drive power control device 1A falsely detects that the vehicle V is slipping in some cases. To avoid this, the drive power control device 1C according to the third embodiment detects the occurrence of slip by using the actual rotational speeds of the drive wheel and the driven wheel. Accordingly, the drive power control device 1C can detect slip more accurately than the drive power control device 1A.

In the third embodiment, the slip probability calculation unit 401 may have a function to detect the occurrence of slip. Specifically, the slip probability calculation unit 401 may calculate a slip probability, detect the occurrence of slip based on the calculated slip probability, and output a result of the detection to the slip reduction control unit 202 not through the slip detection unit 201.

Drive Power Control Device for Electric Vehicle According to Fourth Embodiment

Figure 13:
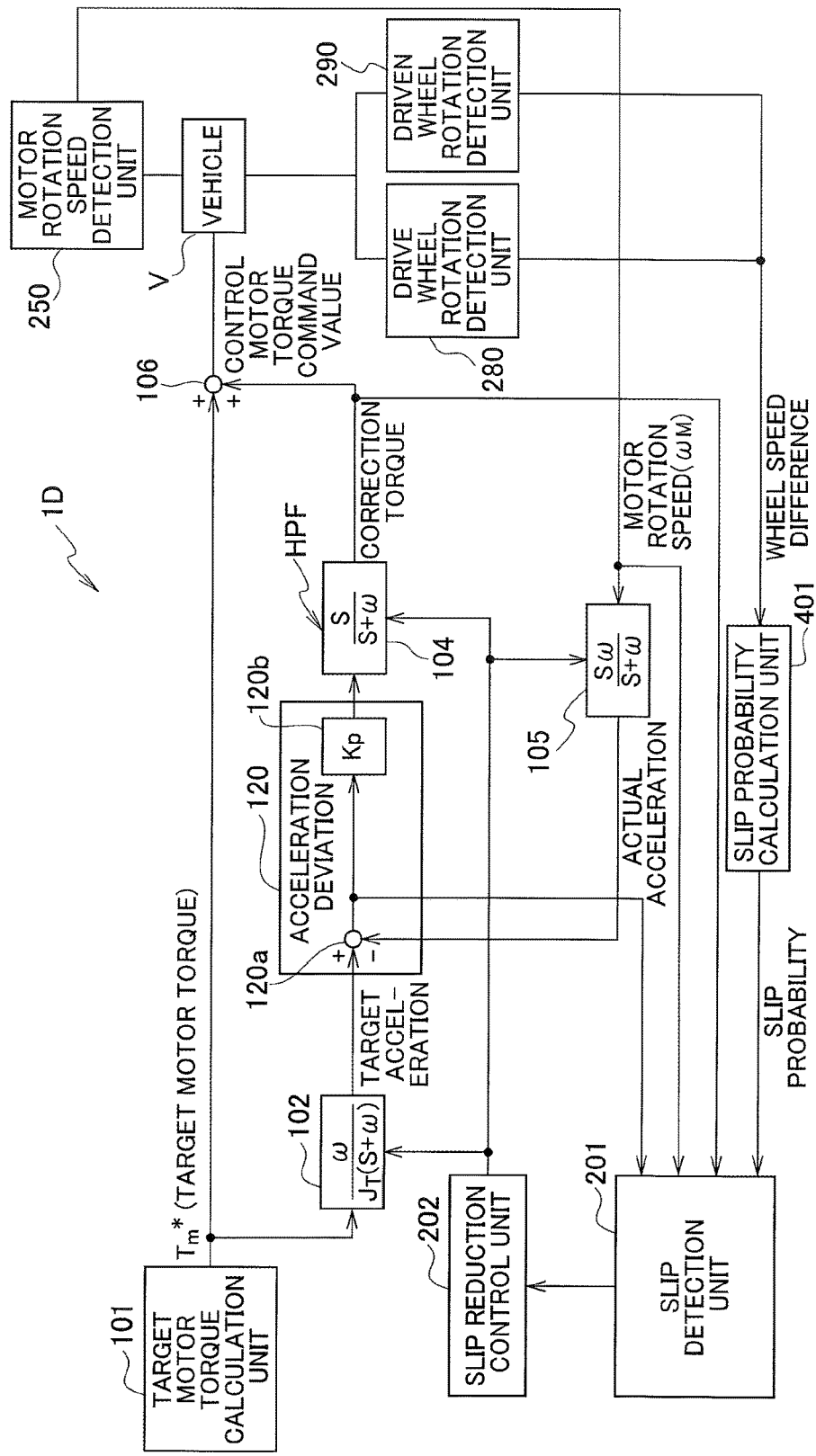
FIG. 13 is a block diagram illustrating an exemplary configuration of a drive power control device for an electric vehicle according to a fourth embodiment.

The following describes the configuration of a drive power control device 1D for an electric vehicle according to a fourth embodiment with reference to FIG. 13.

The fourth embodiment differs from the first embodiment in that the drive power control device 1D includes the drive wheel rotation detection unit 280, the driven wheel rotation detection unit 290, and the slip probability calculation unit 401. Any component identical to that of the first embodiment is denoted by a reference sign in the first embodiment, and thus a description thereof will be omitted. The drive wheel rotation detection unit 280, the driven wheel rotation detection unit 290, and the slip probability calculation unit 401 are same as those of the third embodiment, and thus description thereof will be omitted.

The following characteristics are found through comparison between the slip detection by the slip detection unit 201 based on the amount of acceleration deviation, the correction torque, and the motor rotation speed, and the slip calculation by the slip probability calculation unit 401. Specifically, the slip detection by the slip detection unit 201 based on the amount of acceleration deviation, the correction torque, and the motor rotation speed has excellent response to slip and is applicable to a four-wheel-drive vehicle.

When the slip calculation by the slip probability calculation unit 401 employs CAN communication to transmit a wheel speed to the slip detection unit 201, problem occurs to response. When the transmission is achieved in a wired manner instead, cost potentially increases, but the accuracy of slip detection is high for front-wheel-drive and rear-wheel-drive vehicles.

In the fourth embodiment, the slip detection unit 201 detects the occurrence of slip at two stages. First, the slip detection unit 201 detects the occurrence of slip based on the amount of acceleration deviation, the correction torque, and the motor rotation speed. Thereafter, the slip detection unit 201 detects the occurrence of slip based on the slip probability calculated by the slip probability calculation unit 401.

The drive power control device 1D according to the fourth embodiment switches control in accordance with a result of the first slip detection between the first detection of the occurrence of slip and the second detection of the occurrence of slip. Thereafter, the drive power control device 1D switches control in accordance with a result of the second slip detection. This configuration will be described in detail below.

When the slip detection unit 201 detects slip based on the amount of acceleration deviation, the correction torque, and the motor rotation speed, the slip reduction control unit 202 selects a cutoff frequency effective for slip reduction and performs the slip reduction control. Thereafter, when the slip detection unit 201 detects slip based on the slip probability, in other words, when the first and second detection results are same, the slip reduction control unit 202 continues the slip reduction control. When the slip detection unit 201 detects no slip based on the slip probability, in other words, when the first and second detection results differ from each other, the slip reduction control unit 202 reselects a cutoff frequency effective for torsional vibration reduction and the drive power control device 1D performs the torsional vibration reduction control.

When the slip detection unit 201 detects no slip based on the amount of acceleration deviation, the correction torque, and the motor rotation speed, the slip reduction control unit 202 selects a cutoff frequency effective for torsional vibration reduction and the drive power control device 1D performs the torsional vibration reduction control. Thereafter, when the slip detection unit 201 detects slip based on the slip probability, in other words, when the first and second detection results differ from each other, the slip reduction control unit 202 reselects a cutoff frequency effective for slip reduction and performs the slip reduction control. When the slip detection unit 201 detects no slip based on the slip probability, in other words, when the first and second detection results are same, the drive power control device 1D continues the torsional vibration reduction control.

Figure 14:
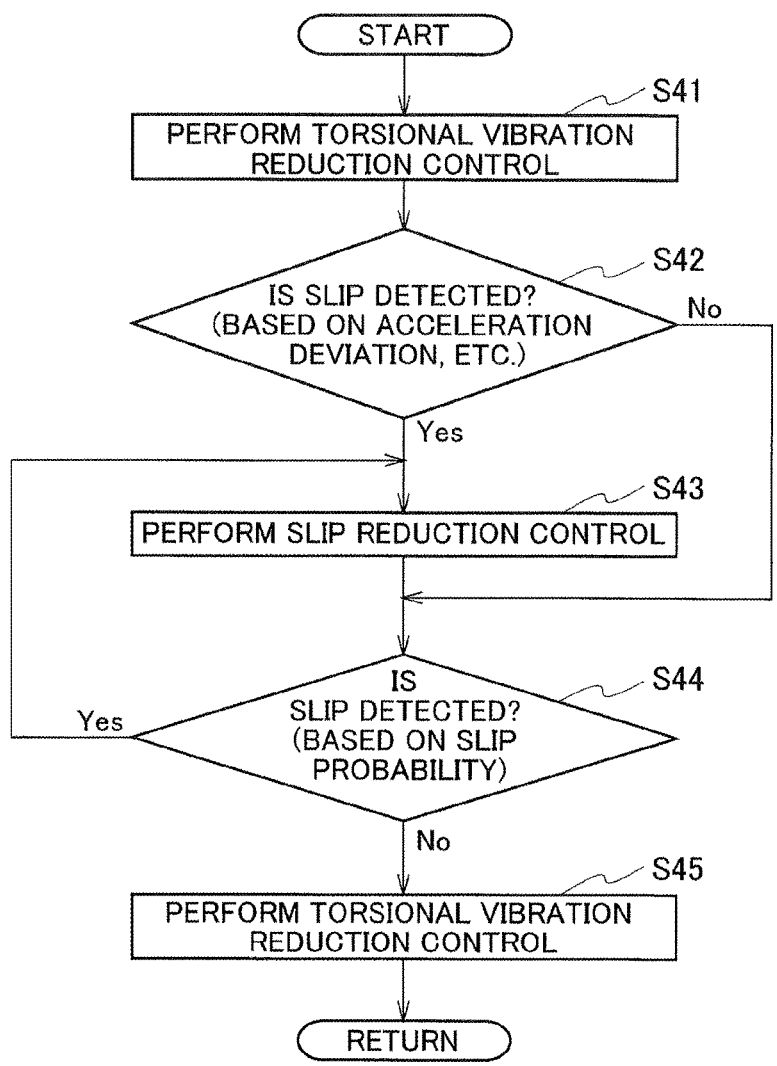
FIG. 14 is a flowchart illustrating a procedure of slip reduction processing executed by the drive power control device for the electric vehicle according to the fourth embodiment.

The following describes, with reference to a flowchart illustrated in FIG. 14, the procedure of the slip reduction processing executed by the drive power control device 1D for the electric vehicle according to the fourth embodiment. In the flowchart illustrated in FIG. 14, the vehicle V is determined to be not stopping at start of the processing.

At step S41, the drive power control device 1D performs the torsional vibration reduction control. The torsional vibration reduction control executes, for example, processing to set the constant ω of the high-pass filter HPF to a value that allows passing of the torsional vibration frequency only (for example, ω=10 rad/s).

At step S42, for example, when the vehicle V stops at a traffic light or the like and then starts traveling, the slip detection unit 201 detects slip based on the amount of acceleration deviation, the correction torque, and the motor rotation speed. If the slip detection unit 201 has detected slip (Yes at step S42), the process proceeds to step S43. If the slip detection unit 201 has detected no slip (No at step S42), the process proceeds to step S44.

At step S43, the slip reduction control unit 202 selects a cutoff frequency effective for slip reduction and performs the slip reduction control.

At step S44, the slip detection unit 201 detects slip based on the slip probability. If the slip detection unit 201 has detected slip (Yes at step S44), the process returns to step S43. If the slip detection unit 201 has detected no slip (No at step S44), the process proceeds to step S45.

At step S45, the drive power control device 1D performs the torsional vibration reduction control.

As described above, the drive power control device 1D according to the fourth embodiment performs the first detection of the occurrence of slip by the excellently responsive method based on the amount of acceleration deviation, the correction torque, and the motor rotation speed, and then performs control based on the first detection result until the second detection of the occurrence of slip. Thereafter, the drive power control device 1D performs the second detection of the occurrence of slip, and performs control based on the second detection result by the highly accurate method. In this manner, the two-staged slip detection at an interval allows the drive power control device 1D to correct any false first detection result. In other words, the drive power control device 1D achieves the response and the accuracy through the two-staged slip detection.

In the fourth embodiment, the slip probability calculation unit 401 may have a function to detect the occurrence of slip. Specifically, the slip probability calculation unit 401 may calculate a slip probability, detect the occurrence of slip based on the calculated slip probability, and output a result of the detection to the slip reduction control unit 202 not through the slip detection unit 201.

The drive power control device 1B according to the second embodiment may include the drive wheel rotation detection unit 280, the driven wheel rotation detection unit 290, and the slip probability calculation unit 401 illustrated in FIG. 12. Accordingly, the drive power control device 1B can accurately detect slip through the two-staged slip detection.

The invention achieved by the present inventor is specifically described above based on the embodiments, but the embodiments disclosed in the present specification are merely exemplary and thus the prevent invention is not limited to the disclosed technology. In other words, the technological scope of the present invention should not be restrictively based on the description of the embodiments, but should be based on description of the claims. The present invention includes any technologies equivalent to technologies described in the claims and all modifications in the scope of the claims.

For example, in the present embodiment, the torsional vibration reduction control and the slip reduction control are performed based on the acceleration of the motor. However, instead, the torsional vibration reduction control and the slip reduction control may be performed based on the speed of the motor.

In this case, for example, a drive power control device for an electric vehicle may include: the target motor torque calculation unit 101 configured to calculate a target motor torque for an electric vehicle (the vehicle V) equipped with the motor 31 as a drive source based on an accelerator operation by the driver; a target speed calculation unit configured to calculate a target speed based on the target motor torque; the motor rotation speed detection unit 250 configured to detect an actual the motor rotation speed; an angular velocity calculation unit configured to calculate a motor angular velocity based on the motor rotation speed detected by the motor rotation speed detection unit 250; a correction amount calculation unit configured to calculate a correction amount for a motor torque command value so that a deviation between the target speed calculated by the target speed calculation unit and the motor angular velocity calculated by the angular velocity calculation unit is reduced; the modeling error reduction unit 104 configured to calculate a correction torque by performing high-pass filter processing on the correction amount calculated by the correction amount calculation unit; the control motor torque command value calculation unit 106 configured to calculate a control motor torque command value by adding the correction torque to the motor torque command value; and the slip reduction control unit 202 configured to perform, when the vehicle starts traveling or slip is detected, control to reduce slip by switching the cutoff frequency of the high-pass filter HPF to be low as compared with normal traveling. Any component denoted by an identical reference sign may have a configuration same as that in the drive power control device 1A for the electric vehicle according to the first embodiment.

Another drive power control device for an electric vehicle (vehicle V) equipped with the motor 31 as a drive source may at least include the motor rotation speed detection unit 250 configured to detect the rotation speed of the motor 31; the correction amount calculation unit 120 including the high-pass filter HPF and configured to calculate a correction amount for a motor torque command value; and the cutoff frequency switch unit 202 configured to switch the cutoff frequency of the high-pass filter HPF in accordance with the rotation speed of the motor detected by the motor rotation speed detection unit 250.

Accordingly, the cutoff frequency switch unit 202, which switches the cutoff frequency of the high-pass filter HPF in accordance with the rotation speed of the motor detected by the motor rotation speed detection unit 250, enables wide application to reduction control of various kinds of vibrations (torsional vibration and torque ripple vibration, for example) occurring to the vehicle V and the slip reduction control.

In the above-described embodiments, the slip reduction control is performed after slip is detected, but may be performed while the vehicle starts traveling (for example, at a speed of 0 to 10 km/h).

Figure 15:
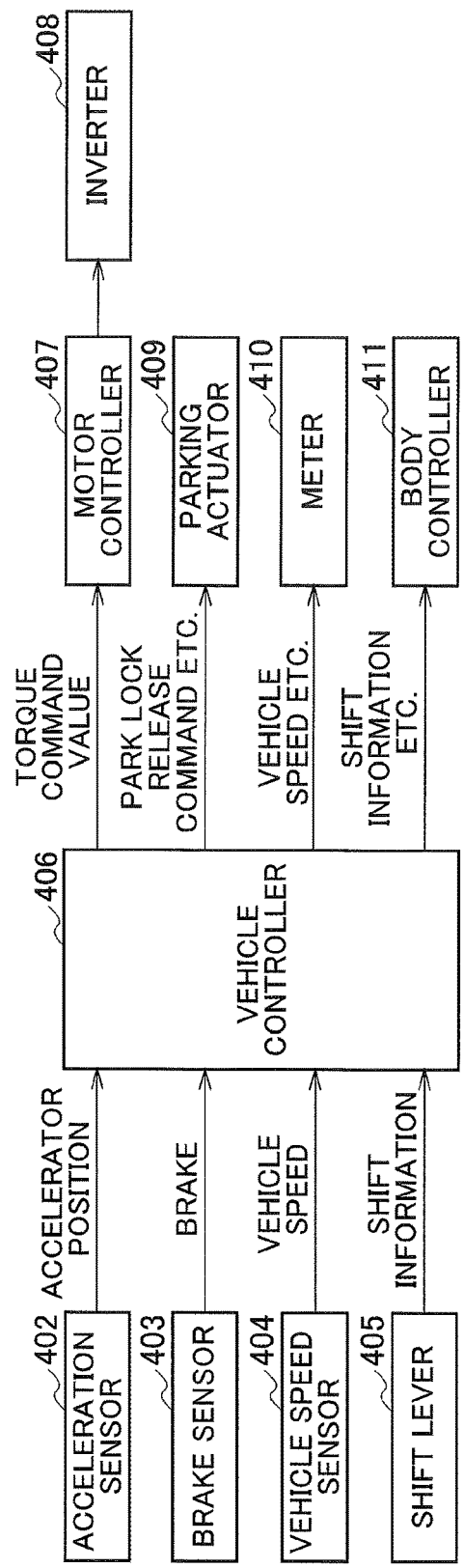
FIG. 15 is a block diagram illustrating an exemplary configuration of a drive power control device for an electric vehicle according to another embodiment of the present invention.
Figure 16:
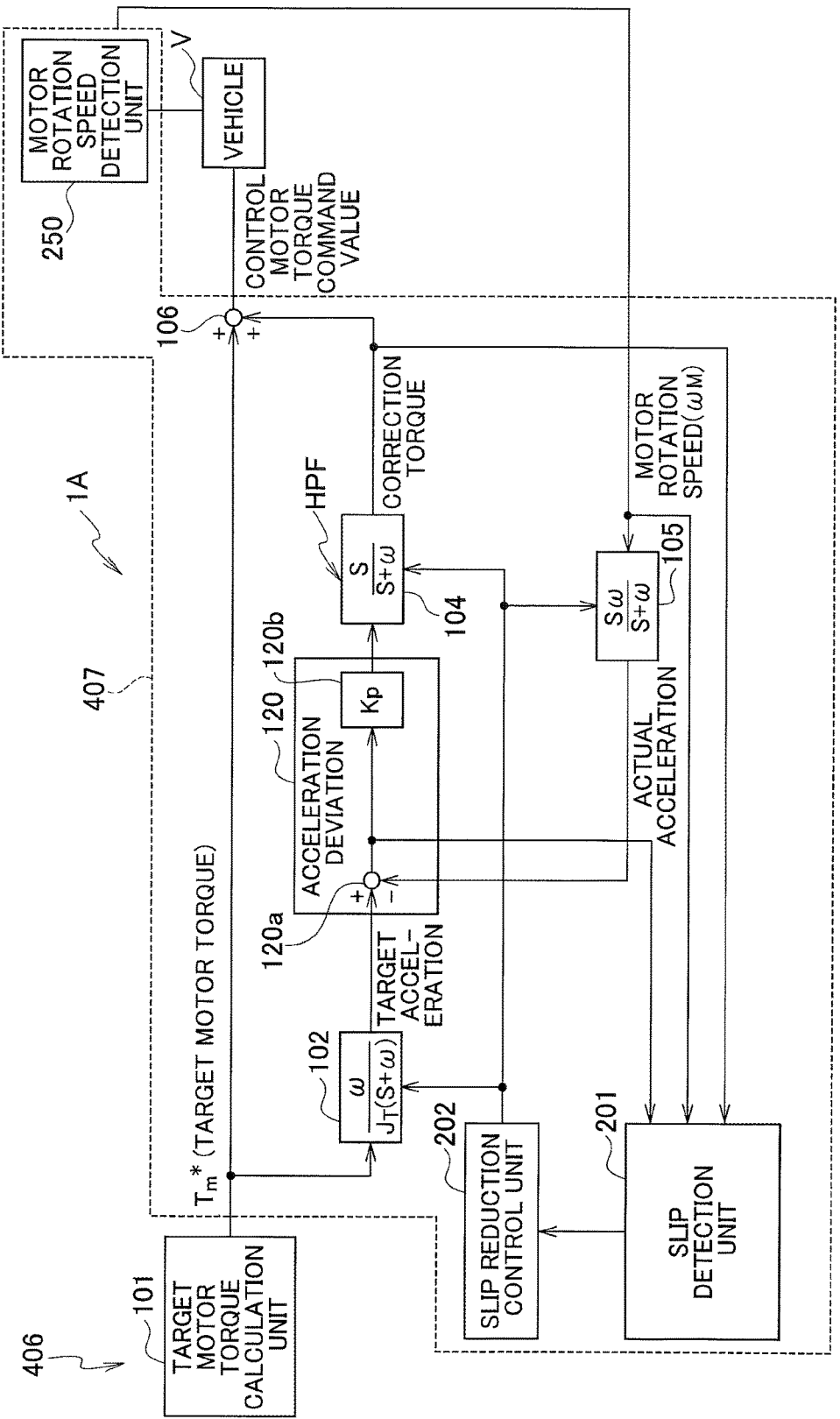
FIG. 16 is a block diagram illustrating an exemplary configuration of a drive power control device for an electric vehicle according to the other embodiment of the present invention.
Figure 17:
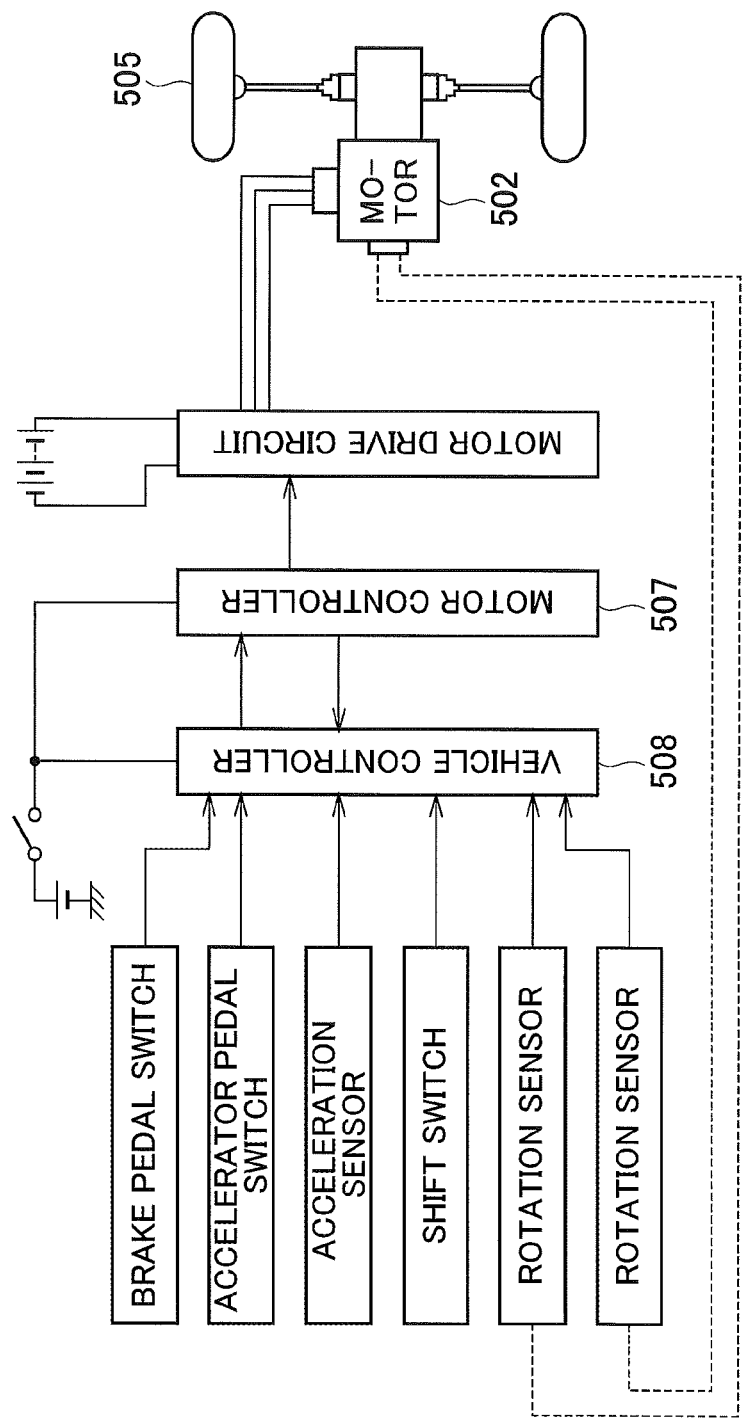
FIG. 17 is a block diagram illustrating an exemplary configuration of a drive power control device for an electric vehicle according to a conventional technology.

As illustrated in FIGS. 15 and 16, the target motor torque calculation unit 101 may be replaced with a vehicle controller 406. The vehicle controller 406 commands a plurality of control devices based on signals from various sensors. This configuration will be specifically described below.

The following first describes the various sensors. As illustrated in FIG. 15, an accelerator sensor 402 detects an accelerator position due to an accelerator operation by the driver and outputs the position to the vehicle controller 406. A brake sensor 403 detects the position of a brake pedal by the driver and outputs the position to the vehicle controller 406. A vehicle speed sensor 404 detects the speed of the vehicle V and outputs the speed to the vehicle controller 406. A shift lever 405 detects shift information and outputs the information to the vehicle controller 406.

The vehicle controller 406 receives signals from the various sensors and controls various kinds of functions (such as traveling, stopping, displaying, air conditioning) of the vehicle V. Specifically, the vehicle controller 406 outputs a torque command value to a motor controller 407 based on the accelerator position. When the shift information is changed from P to another shift, the vehicle controller 406 outputs a signal to a parking actuator 409 to cancel park lock. The vehicle controller 406 displays the received vehicle speed on a meter 410. The vehicle controller 406 outputs shift information and the like to a body controller 411. The vehicle controller 406 is communicated with the motor controller 407 through, for example, CAN communication.

As illustrated in FIG. 16, the motor controller 407 may include the target acceleration calculation unit 102, the motor rotation speed detection unit 250, the actual acceleration calculation unit 105, the correction amount calculation unit 120, the modeling error reduction unit 104, the control motor torque command value calculation unit 106, and the slip reduction control unit 202. The motor controller 407 receives a command from the vehicle controller 406 and controls an inverter 408 to drive the motor 31. The vehicle controller 406 and the motor controller 407 may be each achieved by a central processing unit (CPU), a memory, a calculation circuit, and the like. In the configurations illustrated in FIGS. 4, 12, and 13, any component except for the target motor torque calculation unit 101 and the vehicle V can be achieved by the motor controller 407.

The present invention is based upon and claims the benefit of priority of the prior Japanese Patent Application No. 2015-066286, filed on Mar. 27, 2015, the entire contents of which are incorporated herein by reference.

REFERENCE SIGNS LIST 1A, 1B drive power control device
V vehicle (electric vehicle)
30 drive system
31 motor
32 output shaft
33 drive shaft
34 wheel
35 reduction gear
101 target motor torque calculation unit
102 target acceleration calculation unit
104 modeling error reduction unit
105 actual acceleration calculation unit
106 control motor torque command value calculation unit
120 correction amount calculation unit
120a deviation calculation unit
120b proportional control unit
201 slip detection unit (first slip detection unit)
202 slip reduction control unit (cutoff frequency switch unit)
250 motor rotation speed detection unit
260 PI control unit
270 control configuration switch unit
280 drive wheel rotation detection unit
290 driven wheel rotation detection unit
300 drive power control device
301 target motor torque calculation unit
302 target acceleration calculation unit
304 modeling error reduction unit
305 actual acceleration calculation unit
306 control motor torque command value calculation unit
320 correction amount calculation unit
320a deviation calculation unit 320b proportional control unit
401 slip probability calculation unit (second slip detection unit)
402 accelerator sensor
403 brake sensor
404 vehicle speed sensor
405 shift lever
406 vehicle controller
407 motor controller
408 inverter
409 parking actuator
410 meter
411 body controller
HPF high-pass filter

The invention claimed is:

1. A drive power control device for an electric vehicle (vehicle V) equipped with a motor (31) as a drive source, the device comprising:
    a target motor torque calculation unit (101) configured to calculate a target motor torque for the electric vehicle based on an accelerator operation by a driver;
    a target acceleration calculation unit (102) configured to calculate a target acceleration by dividing the target motor torque by an inertia of a drive system mounted on the electric vehicle;
    a motor rotation speed detection unit (250) configured to detect an actual motor rotation speed;
    an actual acceleration calculation unit (105) configured to calculate an actual acceleration by differentiating the motor rotation speed detected by the motor rotation speed detection unit;
    a correction amount calculation unit (120) configured to calculate a correction amount for a motor torque command value so that a deviation between the target acceleration calculated by the target acceleration calculation unit and the actual acceleration calculated by the actual acceleration calculation unit is reduced;
    a modeling error reduction unit (104) configured to calculate a correction torque by performing high-pass filter processing on the correction amount calculated by the correction amount calculation unit;
    a control motor torque command value calculation unit (106) configured to calculate a control motor torque command value by adding the correction torque to the motor torque command value; and
    a slip reduction control unit (202) configured to perform, when the vehicle starts traveling or slip is detected, control to reduce slip by switching a cutoff frequency of a high-pass filter (HPF) to be low as compared with normal traveling.

2. The drive power control device for the electric vehicle according to claim 1, further comprising a first slip detection unit (201) configured to detect an occurrence of slip based on the correction amount, the correction torque, and the motor rotation speed.

3. The drive power control device for the electric vehicle according to claim 1, wherein, when performing slip reduction control, the slip reduction control unit performs control to switch control of arithmetic processing of the correction amount by the correction amount calculation unit from P control (proportional control) to PI control (proportional-integral control).

4. The drive power control device for the electric vehicle according to claim 1, wherein, the slip reduction control unit performs control to start slip reduction control when the motor rotation speed is less than a first predetermined value $\omega 0$ at start of traveling of the electric vehicle.

5. The drive power control device for the electric vehicle according to claim 1, wherein the slip reduction control unit performs control to start slip reduction control when such three conditions that the motor rotation speed is not lower than a first predetermined value $\omega 0$, an acceleration deviation is not larger than a first predetermined value ae1, and the absolute value of the correction torque is not larger than a first predetermined value T1 are satisfied while the electric vehicle is traveling.

6. The drive power control device for the electric vehicle according to claim 1, wherein the slip reduction control unit performs control to end slip reduction control when the motor rotation speed exceeds a second predetermined value $\omega 1$ and the absolute value of the correction torque is smaller than a first predetermined value T1.

7. The drive power control device for the electric vehicle according to claim 1, wherein the slip reduction control unit performs control to end slip reduction control when such three conditions that the motor rotation speed is not lower than a first predetermined value $\omega 0$, the absolute value of an acceleration deviation is not larger than a second predetermined value ae2, and the absolute value of the correction torque is not larger than a second predetermined value T2 are satisfied while the electric vehicle is traveling.

8. A drive power control device for an electric vehicle (vehicle V) equipped with a motor (31) as a drive source, the device comprising:
    a target motor torque calculation unit (101) configured to calculate a target motor torque for the electric vehicle based on an accelerator operation by a driver;
    a target speed calculation unit configured to calculate a target speed based on the target motor torque;
    a motor rotation speed detection unit (250) configured to detect an actual motor rotation speed;
    an angular velocity calculation unit configured to calculate a motor angular velocity based on the motor rotation speed detected by the motor rotation speed detection unit;
    a correction amount calculation unit configured to calculate a correction amount for a motor torque command value so that a deviation between the target speed calculated by the target speed calculation unit and the motor angular velocity calculated by the angular velocity calculation unit is reduced;
    a modeling error reduction unit (104) configured to calculate a correction torque by performing high-pass filter processing on the correction amount calculated by the correction amount calculation unit;
    a control motor torque command value calculation unit (106) configured to calculate a control motor torque command value by adding the correction torque to the motor torque command value; and
    a slip reduction control unit (202) configured to perform, when the vehicle starts traveling or slip is detected, control to reduce slip by switching a cutoff frequency of a high-pass filter (HPF) to be low as compared with normal traveling.

9. The drive power control device for the electric vehicle according to claim 1, further comprising:
    a drive wheel rotation detection unit (280) configured to detect a rotation state of a drive wheel of the electric vehicle;
    a driven wheel rotation detection unit (290) configured to detect a rotation state of a driven wheel of the electric vehicle; and
    a second slip detection unit (401) configured to detect an occurrence of slip based on a deviation between the rotation state of the drive wheel detected by the drive wheel rotation detection unit (280) and the rotation state of the driven wheel detected by the driven wheel rotation detection unit (290).

10. The drive power control device for the electric vehicle according to claim 2, further comprising:
    a drive wheel rotation detection unit (280) configured to detect a rotation state of a drive wheel of the electric vehicle; and
    a driven wheel rotation detection unit (290) configured to detect a rotation state of a driven wheel of the electric vehicle; and
    a second slip detection unit (401) configured to detect an occurrence of slip based on a deviation between the rotation state of the drive wheel detected by the drive wheel rotation detection unit (280) and the rotation state of the driven wheel detected by the driven wheel rotation detection unit (290),
    wherein the second slip detection unit (401) detects the occurrence of slip after slip is detected by the first slip detection unit (201).

11. The drive power control device for the electric vehicle according to claim 10, wherein the slip reduction control unit (202) reduces slip by switching the cutoff frequency of the high-pass filter (HPF) to be low as compared with normal traveling until the occurrence of slip is detected by the second slip detection unit (401) after slip is detected by the first slip detection unit (201).

12. The drive power control device for the electric vehicle according to claim 11, wherein, when a result of the detection of slip by the first slip detection unit (201) differs from a result of the detection of slip by the second slip detection unit (401), the slip reduction control unit (202) reselects a cutoff frequency based on the result of the detection of slip by the second slip detection unit (401).

13. The drive power control device for the electric vehicle according to claim 1, wherein
    the target motor torque calculation unit (101) is a vehicle controller (406) configured to command a plurality of control devices, and
    the target acceleration calculation unit (102), the motor rotation speed detection unit (250), the actual acceleration calculation unit (105), the correction amount calculation unit (120), the modeling error reduction unit (104), the control motor torque command value calculation unit (106), and the slip reduction control unit (202) are a motor controller (407) configured to receive a command from the vehicle controller (406) and drive the motor (31).

\* \* \* \* \*